United States Patent
Boasso

(10) Patent No.: US 9,926,680 B2
(45) Date of Patent: Mar. 27, 2018

(54) METHOD AND APPARATUS FOR EROSION CONTROL AND ENVIRONMENTAL PROTECTION

(71) Applicant: Walter J. Boasso, Baton Rouge, LA (US)

(72) Inventor: Walter J. Boasso, Baton Rouge, LA (US)

( * ) Notice: Subject to any disclaimer, the term of this patent is extended or adjusted under 35 U.S.C. 154(b) by 0 days.

(21) Appl. No.: 15/431,510

(22) Filed: Feb. 13, 2017

(65) Prior Publication Data

US 2017/0233965 A1    Aug. 17, 2017

Related U.S. Application Data

(60) Provisional application No. 62/295,460, filed on Feb. 15, 2016.

(51) Int. Cl.
| | |
|---|---|
| *E02B 3/12* | (2006.01) |
| *A01K 61/54* | (2017.01) |
| *A01K 61/73* | (2017.01) |
| *A01K 61/78* | (2017.01) |
| *E02D 5/22* | (2006.01) |

(52) U.S. Cl.
CPC .............. *E02B 3/123* (2013.01); *A01K 61/54* (2017.01); *A01K 61/73* (2017.01); *A01K 61/78* (2017.01); *E02B 3/121* (2013.01); *E02D 5/22* (2013.01); *E02D 2300/002* (2013.01)

(58) Field of Classification Search
CPC ........ A01K 61/70; A01K 61/54; A01K 61/73; A01K 61/75; A01K 61/77; A01K 61/78; E02D 5/22; E02D 2300/002; E02B 3/123; E02B 3/14; E02B 5/22; E02B 2300/002

USPC ........ 405/15, 16, 17, 18, 19, 20, 21, 25, 26, 405/27, 28, 30; 119/234, 238
See application file for complete search history.

(56) References Cited

U.S. PATENT DOCUMENTS

| | | | | |
|---|---|---|---|---|
| 2,502,757 | A | * | 4/1950 | Shearer ................... E02B 3/123 |
| | | | | 160/220 |
| 2,922,393 | A | | 1/1960 | Munz |
| 3,344,609 | A | | 10/1967 | Greiser |
| 3,495,573 | A | * | 2/1970 | Vanderborgh, Jr. ... A01K 61/54 |
| | | | | 119/238 |

(Continued)

FOREIGN PATENT DOCUMENTS

| | | |
|---|---|---|
| CN | 1388081 | 1/2003 |
| CN | 104396802 | 3/2015 |

(Continued)

OTHER PUBLICATIONS

Theuerkauf, S.J., Burke, R.P., Lipcius, R.N., Settlement, growth and survival of eastern oysters on alternative reef substrates, Oct. 28, 2014, all pages.*

(Continued)

*Primary Examiner* — Carib A Oquendo
(74) *Attorney, Agent, or Firm* — Brett A. North

(57) ABSTRACT

A method and apparatus incorporating erosion preventing mats or blankets having oyster spat are placed to prevent or reduce erosion. The method and apparatus incorporates seeding with oyster spat and/or oyster larvae onto a blanket having rough surfaces and comprising calcium. After seeding and setting natural growth of the oyster larvae can create a barrier that helps prevent erosion by breaking the kinetic energy of waves.

19 Claims, 29 Drawing Sheets

(56) References Cited

U.S. PATENT DOCUMENTS

| | | | |
|---|---|---|---|
| 3,638,615 A | 2/1972 | Budge et al. | |
| 3,651,649 A | 3/1972 | Najvar et al. | |
| 3,696,623 A | 10/1972 | Heine et al. | |
| 3,702,599 A | 11/1972 | Herolzer | |
| 3,811,411 A | 5/1974 | Moeller | |
| 3,871,182 A | 3/1975 | Estruco | |
| 4,130,994 A | 12/1978 | Van Moss, Jr. | |
| 4,135,843 A | 1/1979 | Umemoto et al. | |
| 4,231,322 A * | 11/1980 | Gilpatric | A01K 61/54 119/237 |
| 4,286,895 A * | 9/1981 | Poli | E02B 3/121 405/16 |
| 4,370,075 A * | 1/1983 | Scales | E01C 9/004 404/41 |
| 4,375,928 A | 3/1983 | Crow et al. | |
| 4,405,257 A | 9/1983 | Nielson | |
| 4,427,829 A | 1/1984 | Ohara et al. | |
| 4,465,398 A | 8/1984 | Knudsen | |
| 4,477,206 A | 10/1984 | Papetti et al. | |
| 4,508,057 A | 4/1985 | Suzuki | |
| 4,521,131 A | 6/1985 | Nandlal | |
| 4,657,433 A | 4/1987 | Holmberg | |
| 4,683,156 A | 7/1987 | Waters | |
| 4,804,293 A | 2/1989 | Várkonyi et al. | |
| 4,844,015 A | 7/1989 | Garvey et al. | |
| 5,024,560 A | 6/1991 | Reilly | |
| 5,158,395 A | 10/1992 | Holmberg | |
| 5,269,254 A * | 12/1993 | Gagliano | A01K 61/54 119/236 |
| 5,484,230 A | 1/1996 | Rudloff | |
| 5,511,514 A | 5/1996 | Hitchins et al. | |
| 5,556,228 A | 9/1996 | Smith | |
| 5,647,695 A | 7/1997 | Hilfiker et al. | |
| 5,697,736 A | 12/1997 | Veazey et al. | |
| 5,762,449 A | 6/1998 | Hey | |
| 5,779,391 A | 7/1998 | Knight | |
| 5,786,281 A | 7/1998 | Prunty et al. | |
| 5,951,202 A | 9/1999 | Brown | |
| 6,071,041 A | 6/2000 | Knight | |
| 6,431,792 B1 | 8/2002 | Barnes | |
| 6,508,607 B1 | 1/2003 | Smith et al. | |
| 6,579,038 B1 * | 6/2003 | McAllister | E02B 3/123 404/38 |
| 6,586,083 B1 | 7/2003 | Weiss, Jr. et al. | |
| 6,659,686 B2 | 12/2003 | Veazey | |
| 6,929,425 B1 | 8/2005 | Kimberlin et al. | |
| 7,001,554 B2 | 2/2006 | Bohannon, Jr. | |
| 7,303,670 B2 | 12/2007 | McPhillips | |
| 7,603,959 B1 | 10/2009 | Veazey | |
| 7,670,082 B2 | 3/2010 | Olsta et al. | |
| 7,762,205 B1 | 7/2010 | Veazey | |
| 7,837,414 B2 | 11/2010 | Heseldon | |
| RE42,259 E | 3/2011 | Campbell et al. | |
| 7,992,509 B1 * | 8/2011 | Veazey | E02L 33/06 114/267 |
| 8,251,607 B2 * | 8/2012 | Buch | E01C 5/00 404/34 |
| 8,312,843 B2 | 11/2012 | Ortego et al. | |
| 8,635,973 B1 | 1/2014 | Shepard, III | |
| 8,651,770 B2 | 2/2014 | Lancaster | |
| 9,057,168 B1 | 6/2015 | Dugan, Jr. | |
| 2002/0104469 A1 | 8/2002 | Veazey | |
| 2003/0077122 A1 | 4/2003 | Carnahan et al. | |
| 2003/0094141 A1 | 5/2003 | Davis | |
| 2003/0147705 A1 * | 8/2003 | McAllister | E02B 3/123 405/284 |
| 2006/0147656 A1 | 7/2006 | Mathieu | |
| 2007/0181072 A1 | 8/2007 | Davis | |
| 2007/0283866 A1 | 12/2007 | Veazey | |
| 2010/0278594 A1 | 11/2010 | Sheridan | |
| 2013/0022404 A1 | 1/2013 | Stinson | |
| 2014/0270960 A1 | 9/2014 | Breitenbeck | |
| 2015/0264898 A1 * | 9/2015 | Ortego | A01K 61/002 119/234 |
| 2016/0135435 A1 | 5/2016 | Manning et al. | |
| 2016/0302396 A1 * | 10/2016 | Tickle | A01K 61/006 |
| 2017/0152640 A1 * | 6/2017 | Benton, Jr. | E02B 3/123 |

FOREIGN PATENT DOCUMENTS

| | | |
|---|---|---|
| DE | 2908077 | 9/1980 |
| GB | 2190385 | 11/1987 |
| WO | 2004/071184 | 8/2004 |
| WO | 2014/210100 | 12/2014 |
| WO | 2015/048219 | 4/2015 |
| WO | 2015/175975 | 11/2015 |

OTHER PUBLICATIONS

Ippolito, V.D., Evaluating remote setting techniques for oyster (Crassostrea virginica) seed production in Louisiana, 2010, all pages.*

"Reference Manual for SPAT Oyster Gardeners" 2012.

Victoria Ippolito. "Evaluating Remote Setting Techniques for Oyster (Crassostrea Virginica) Seed Production in Louisiana" Dec. 2010.

Michael Spohn Congrove. "A Bio-Economic Feasibility Model for Remote Setting: Potential for Oyster Aquaculture in Virginia." 2008.

Chris A. Boyd, Ph.D. and Niki L. Pace, J.D., LL.M. "Coastal Alabama Living Shorelines Policies, Rules, and Model Ordinance Manual." 2013.

Molly Loughney Melius and Margaret R. Caldwell. "2015 California Coastal Armoring Report: Managing Coastal Armoring and Climate Change Adaptation in the 21st Century" 2015.

Trista Talton. "Evidence Mounts of Shorelines' Success" Feb. 9, 2016.

"Living Shoreline Project: Altamaha-Ogeechee Estuarine Complex, GA Alternative estuarine erosion control and implementation." Downloaded before Feb. 13, 2017.

Jones, G. & B. Jones. "Advances in the Remote setting of oyster larvae." 1988.

Dr. TJW (Tom) Ysebaert. "Living coastal protection" Downloaded before Feb. 13, 2017.

Trista Talton. "Living Shorelines: Better Than Bulkheads." Feb. 8, 2016.

"Living Shorelines: An environmentally friendly alternative for stabilizing your waterfront property." www.galvbay.org Downloaded before Feb. 13, 2017.

Duke University (Mar. 5, 2012). New report questions hard-edged 'living shorelines' in estuaries. ScienceDaily.

Ray Grizzle "Oyster Reef Restoration" http://www.grizzlecoastalconsulting.com/oyster-reef-restoration.html Downloaded before Feb. 13, 2017.

"Oyster Reef Restoration at North Fork St. Lucie River Aquatic Preserve." Apr. 6, 2015.

"Oyster shells used to rebuild eroded coasts" Associated Press. Oct. 29, 2008.

Niikil Pace "Armoring vs. Living Shorelines: The Regulatory Dilemma in the Gulf of Mexico" Apr. 23, 2010.

Steven B. Scyphers, Sean P. Powers, Kenneth L. Heck Jr, Dorothy Byron; Oyster Reefs as Natural Breakwaters Mitigate Shoreline Loss and Facilitate Fisheries. Aug. 5, 2011.

Restore America's Estuaries. 2015. "Living Shorelines: From Barriers to Opportunities." Arlington, VA.

Niki L. Pace, J.D., LL.M. "Shellfish Restoration and Alternative Shoreline Protection Policies of the Southeastern United States: Florida, Georgia, North Carolina and South Carolina." Aug. 15, 2012.

C.A. Currin, W.S. Chappell, and A. Deaton. "Developing Alternative Shoreline Armoring Strategies: The Living Shoreline Approach in North Carolina." 2010.

Seachange Consulting. "Weighing Your Options." Jun. 2011.

Ronald R. Lukens and Carrie Selberg. "Guidelines for Marine Artificial Reef Materials Second Edition." Jan. 2004.

(56) References Cited

OTHER PUBLICATIONS

Baggett, L.P., S.P. Powers, R. Brumbaugh, L.D. Coen, B. DeAngelis, J. Greene, B. Hancock, and S. Morlock, 2014. Oyster habitat restoration monitoring and assessment handbook. The Nature Conservancy, Arlington, VA, USA.
Hermes Redi, G. Cecconi. "The Venice Project Building with Nature for Environmental Restoration and Resilient Storm Surge Protection." Nov. 21-22, 2013.
H Pilkey, Rob Young, Norma Longo, Andy Coburn. "Rethinking Living Shorelines" Mar. 1, 2012.
Trista Talton. "Critics: Shoreline Permits Need Reform" Feb. 10, 2016.
Brenda Walles, Tom Ysebaert, Karin Troost, Peter Herman and Aad Smaal. "The use of an ecosystem engineer in coastal defense." Aug. 2011.
Phanor H. Montoya-Maya, Kaylee P. Smit, April J. Burt, Sarah Frias-Torres. "Large-scale coral reef restoration could assist natural recovery in Seychelles, Indian Ocean." Nov. 2016.
Lindsey Marie George "Relative Habitat Value of Alternative Substrates Used in Oyster Reef Restoration." August 2013.
Delmarva Now. "Underwater castles built for oysters" Dec. 6, 2016.
"Oyster" Wikipedia.com Oct. 19, 2016.
"StormSmart Properties Fact Sheet 3: Planting Vegetation to Reduce Erosion and Storm Damage" Dec. 2013/ Selected Updates Aug. 2014.
Shawn Stokes, Susan Wunderink, Marcy Lowe, Gary Gereth. "Restoring Gulf Oyster Reefs". Jun. 3, 2012 Center on Globalization, Governance & Competitiveness, Duke University.
"Oyster Shell Aggregate" Oct. 21, 2016; https://materia.nl/article/oyster-shell-aggregate/.
"Shells Instead of Sea Walls? Experts Give it a Shot." NBC News. 2008 The Associated Press.
Vincent Encomio and Jennifer Thiery. "Direct Seeding of Hatchery-Produced Oyster Larvae on to Constructed Oyster Reefs in The St. Lucie Estuary, Florida" Florida Oceanographic Society, Stuart, Florida and [2]Indian River State College, Fort Pierce, Florida. 2014.
Chela J. Zabin, Sarikka Attoe, Edwin D. Gros Holz and Caitlin Coleman-Hulbert. "Shellfish Conservation and Restoration in San Francisco Bay: Opportunities and Constraints Final Report for the Subtidal Habitat Goals Committee" University of California, Davis Apr. 29, 2010 Revised Sep. 17, 2010.
"ArmorFlex" Dec. 7, 2016 http://www.conteches.com/products/erosioncontrol/hardarmor/armorflex.
"Technical Aspects of Oyster Restoration" Dec. 6, 2016. http://chesapeakebay.noaa.gov/oysters/technicalaspectsofoysterrestoration.
David McColl, Joy Brown; "Yawkey Living Shorelines Pilot Project. Oyster Recruitment & Erosion Control on South Island." Downloaded before Feb. 13, 2017.
Georgia Department of Natural Resources. 2013. "Living Shorelines along the Georgia Coast: A Summary Report of the First Living Shoreline projects in Georgia." Coastal Resources Division, Brunswick, GA 43 pp. plus appendix.
M. Tangelder, T.J.W. Ysebaert, S.N. Chowdhury , S. Reinhard, F. Doorn, M.S. Hossain, A.C. Smaal. "Eco-engineered coastal defense integrated with sustainable aquatic food production in Bangladesh (ECOBAS)" Jun. 24, 2015. IMARES Wageningen UR.
"Restoration in an Ever-Changing World" The 16th International Conference on Shellfish Restoration. Dec. 10-13, 2014 Charleston, SC USA.
Kelton L. Clark, James G. Hunter, Mark M. Bundy, Dong Hee Kang. "Evaluation of Waste Concrete Road Materials for Use in Oyster Aquaculture". Feb. 2013. Morgan State University.
Chunlei Fan, Kelton L Clark; Evaluation of Waste Concrete Road Materials for Use in Oyster Aquaculture—Field Test; Feb. 2015; Morgan State University.
"Oyster Castles" Allied Concrete. Dec. 6, 2016.
Seth J. Theuerkauf, Russell P. Burke, Romuald N. Lipcius; "Settlement, growth and survival of eastern oysters on alternative reef substrates". Oct. 28, 2014.
Kristy Noel Kelley. "Use of Recycled Oyster Shells as Aggregate for Pervious Concrete". University of Florida 2009.
P.Sasi Kumar , C.Suriya Kumar, P.Yuvaraj , B.Madhan Kumar , Er.K.Jegan Mohan. "A Partial Replacement for Coarse Aggregate by Sea Shell and Cement by Lime in Concrete." 2016.
Itaru Horiguchi, Yoichi Mimura. "Basic Properties of Oyster Shell Porous Concrete Used Oyster Shell Aggregate With Different Particle Size." Mar. 3, 2014.
"Bulk Crushed Oyster Shells offers wholesale and truckload amounts of cleaned crushed oyster shells." 2016.
Eunik Yanga. Seongtae YIB. Youngmoon Leem. "Effect of oyster shell substituted for fine aggregate on concrete characteristics: Part I. Fundamental properties." Mar. 2005.
Chou-Fu Liang and Hung-Yu Wang. "Feasibility of Pulverized Oyster Shell as a Cementing Material" Mar. 4, 2013.
Benjamin R. Etuk, Idongesit F. Etuk and Linus O. Asuquo. "Feasibility of Using Sea Shells Ash as Admixtures for Concrete" Jan. 20, 2012.
"Myco Supply offers mushroom growing equipment, supplies and tools. Grow mushrooms and cultivate fungi easily." Dec. 6, 2016. https://mycosupply.com/offline/crushed_oyster_shell.html.
Yoon H , Park S, Lee K, Park J. "Oyster shell as substitute for aggregate in mortar." Jun. 22, 2004.
"Oyster Shell Slab Foundations" Dec. 6, 2016. http://houstonslabfoundations.com/oystershellslabfoundations/.
"Oysters, Oysters, Oysters, Oyster Shell, Tabby, Scallop Shell,Bocce Ball Shell Mix." Dec. 6, 2016. http://www.carolinasupplies.com/topic.asp?id=14.
Patrick Webb. "Oyster Shell Tabby." Apr. 25, 2015. http://realfinishes.blogspot.com/2015/04/blogpost.html.
Zhong Bin-Yang. Zhou Qiang .Chan Chang-Feng. Yu Yan. "Structure and Property Characterization of Oyster Shell Cementing Material." 2012.
"Tabby concrete" From Wikipedia, the free encyclopedia. Nov. 28, 2016.
Adekunle P. Adewuyi, Shodolapo O. Franklin, Kamoru A. Ibrahim. "Utilization of Mollusc Shells for concrete Production for Sustainable Environment." Sep. 9, 2015.
Anibal Ramirez . Steve D. Barker . Timothy J. Love . Edward J. Milazzo . Lawrence P. McGillicuddy. "Waste Shell Cement Composites." 2015.
Dave Schulte, Gary Ray, and Deborah Shafer. "Use of Alternative Materials for Oyster Reef Construction." Sep. 2009.
Karl Blankenship. "Maryland Getting Florida Oyster Shell to Build Reef." Downloaded before Feb. 13, 2017.
"Chesapeake Bay Oyster Recovery: Native Oyster Restoration Master Plan." Prepared by U.S. Army Corps of Engineers Baltimore and Norfolk Districts. Mar. 2012.
Valentin V. Tepordei. "Stone, Crushed." 2000.
"Cryl-A-Flex" www.dur-a-flex.com. Downloaded before Feb. 13, 2017.
Jingle Davis. "Following the Trail. Tabby on the S.E. Coast." May 19, 2009.
"Gulf Coast Aggregates, LLC Company Profile" http://www.zoominfo.com/c/GulfCoastAggregates, Llc/343716820. Dec. 7, 2016.
Tyler Ortego. "Analysis of Bioengineered Concrete for Use in a Submerged Reef Type Breakwater" Aug. 2006.
Michael Osinksi. "Oyster Foundation". Nov. 26, 2013.
"Small Snail Shell Grinding Machine" Dec. 7, 2017. http://www.doublerollcrusher.xyz/1434125441/smallsnailshellgrindingmachine/.
"Restoring the native eastern oyster" The Nature Conservancy in Virginia. Apr. 2008.
"Sample records for waste oyster shells" Dec. 7, 2016 http://www.science.gov/topicpages/w/waste+oyster+shells.html.
Richard E. Bohn, Donald W. Webster and Donald W. Meritt; "Producting Oyster Seed by Remote Setting" Publication No. UM-SG-MAP-95-03.
Michael S. Congrove, Dr. James A. Wesson, Dr. Standish K. Allen, Jr.; "A Practical Manual for Remote Setting in Virginia" Jan. 2009.
"Setting Oyster Larvae on the Farm" May 17, 2003.

(56) References Cited

OTHER PUBLICATIONS

"Oyster Culture Cycle" Louisiana Sea Grant College Program. Downloaded before Feb. 13, 2017.
John W. Ewart, E. J. Chalabala, F. Marenghi, S. Mitchell and G. Ozbay. "Small-scale Remote Setting and Use of Existing Off-Bottom Structure for Oyster Stock Enhancement in Delawares Coastal (Inland) Bays." Downloaded before Feb. 13, 2017.
John Supan. "Using Remote Setting to Produce Seed Oysters in Louisiana and the Gulf Coastal Region." The Louisiana Sea Grant College Program . Downloaded before Feb. 13, 2017.

\* cited by examiner

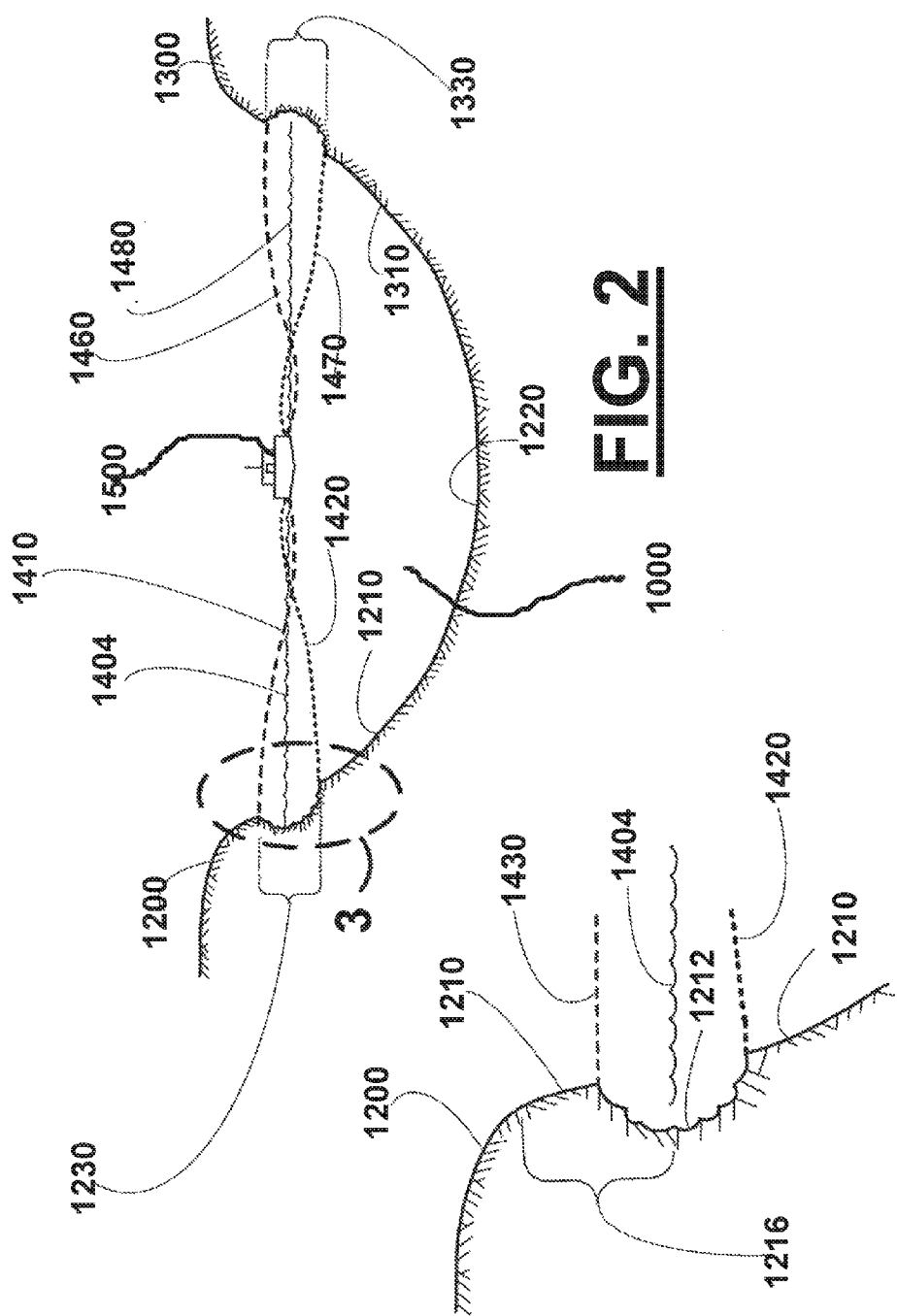

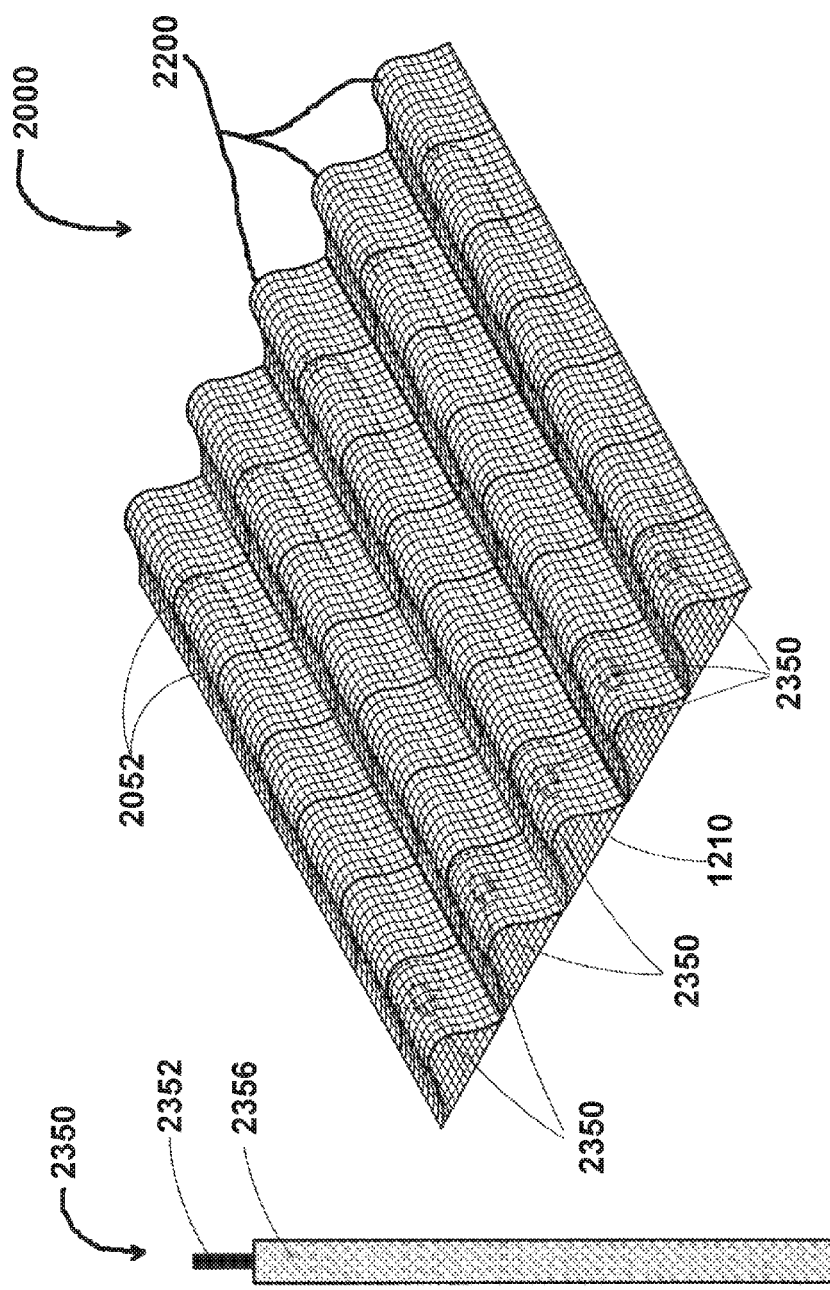

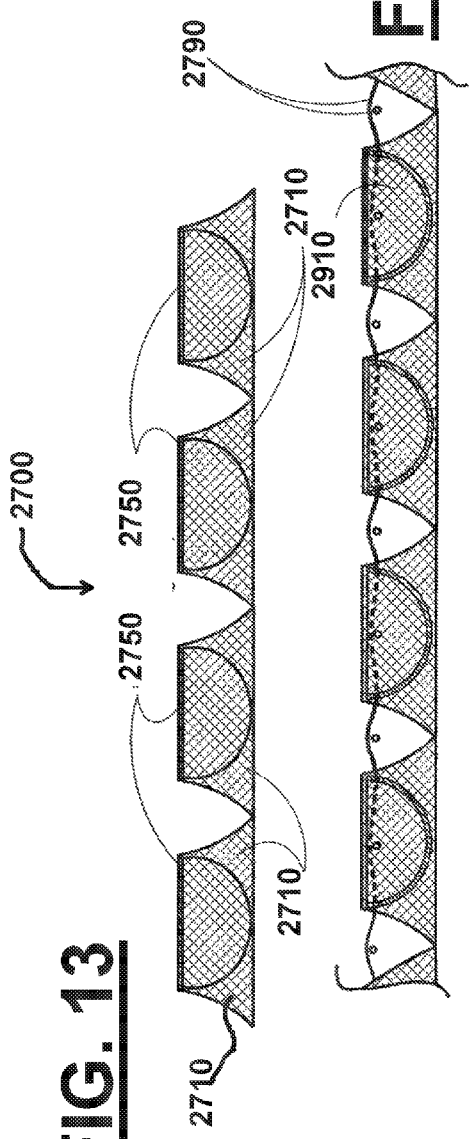
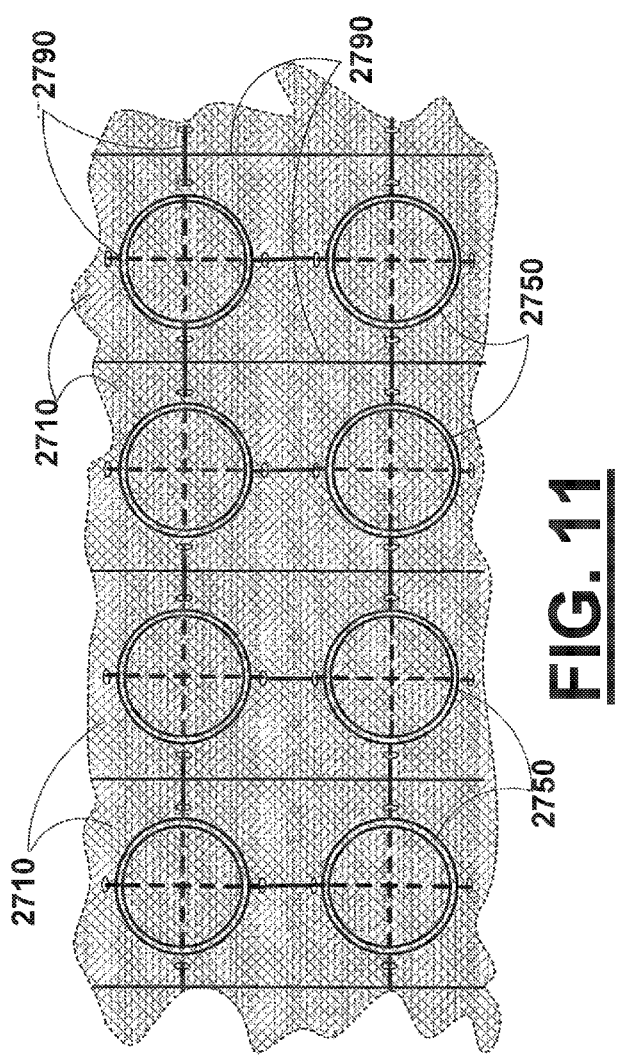
FIG. 11
FIG. 12
FIG. 13

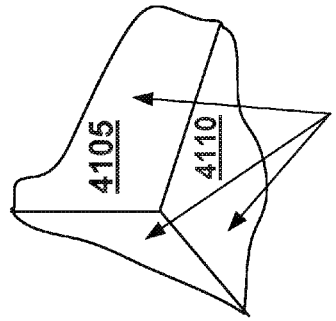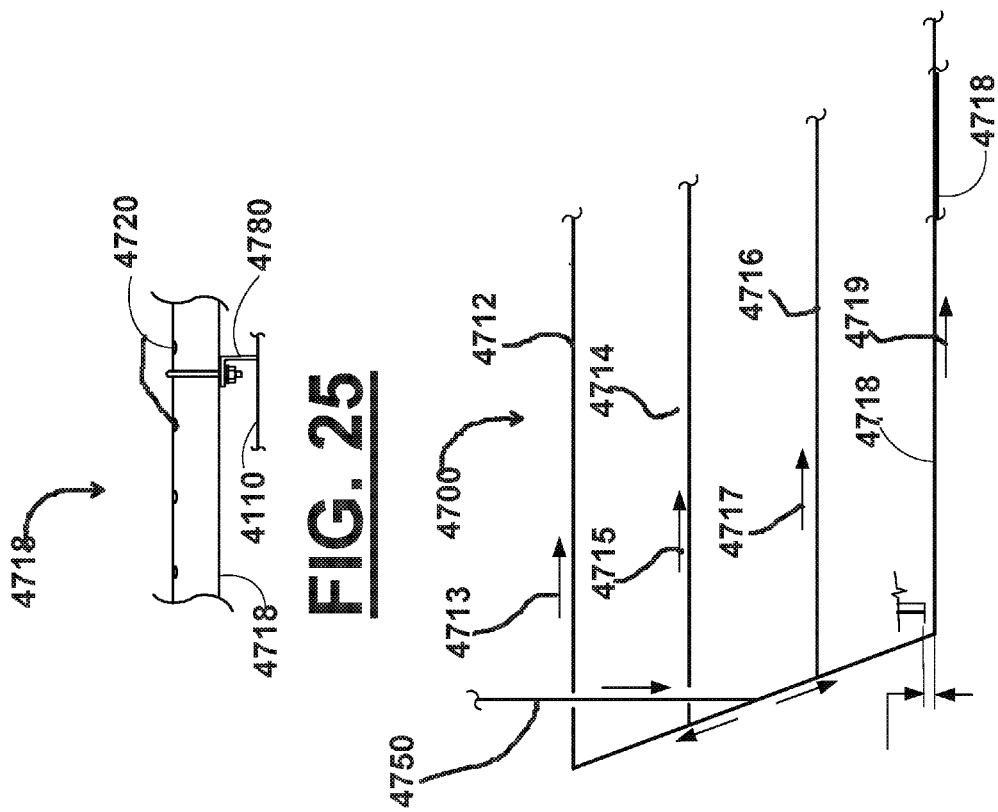

METHOD AND APPARATUS FOR EROSION CONTROL AND ENVIRONMENTAL PROTECTION

CROSS-REFERENCE TO RELATED APPLICATIONS

This is a non-provisional of U.S. provisional patent application Ser. No. 62/295,460, filed Feb. 15, 2016, which application in incorporated herein by reference in its entirety.

STATEMENT REGARDING FEDERALLY SPONSORED RESEARCH OR DEVELOPMENT

Not applicable

REFERENCE TO A "MICROFICHE APPENDIX"

Not applicable

BACKGROUND

Improvements are needed regarding protection against the erosion of shorelines. In many areas, soil conditions are such that shorelines or banks are susceptible to damage due to wave action and/or water wash induced by marine traffic, storms, flash floods and the like.

As an example of the erosion which can occur along a waterway and the problems associated therewith, consider the Mississippi River Gulf Outlet (the "MRGO") which runs through coastal marsh of southeast Louisiana. Originally, the MRGO was conceived as a shortcut to the Port of New Orleans from the Gulf of Mexico avoiding the serpentine Mississippi River. There, the MRGO was created by dredging a channel through the mud, muck, marsh and wetlands of southeastern Louisiana. When originally completed, in the early 1960's, the MRGO was approximately 36-38 feet deep, and between 500 to 600 feet wide. Since then, the sidewalls and banks of the MRGO have been subjected to erosion due to wave action from marine vessels, as well as from waves induced via wind action, including tropical storms and hurricanes which periodically slam into the coast of Louisiana. As a result of such erosion of its sidewalls and banks, the average width of the MRGO by 2005 had expanded to about 2,000 feet, i.e., about three to four times its original width.

As the width of the MRGO grew, the adjacent coastline of Louisiana lost the benefit of the soil and vegetation which used to be present there and which served as a buffer to dampen the storm surge and winds which accompany tropical storms and hurricanes. The greatly expanded width of the MRGO, caused by the erosion of its sidewalls and banks, contributed to the devastation of the City of New Orleans and the surrounding area which was wrought by Hurricane Katrina in 2005. The hurricane's wind created a catastrophic storm surge of water that raced unimpeded up the hugely-expanded MRGO and into the city, resulting in over one thousand deaths and billions of dollars in property damage.

A similar problem exists where the shoreline of an open body of water, such as a lake, is subject to wave wash due to marine vessels and/or wind-induced wave action. The erosion of such shoreline is particularly detrimental when it occurs on barrier islands which otherwise serve to protect the adjacent mainland from storms. Such erosion also damages the delicate ecosystem and habitat of plants, animals and marine life living in the area.

A similar problem exists along the banks of fresh-water streams which are subject to erosion due to water wash associated with flash floods, as for example after a torrential rain.

To prevent such problems, various embodiments can provide cost-effective methods and apparatuses for protecting shorelines, sidewalls and banks against erosion due to wave action and/or water wash.

In various embodiments of the method and apparatus erosion preventing mats or blankets having oyster spat are placed to prevent or reduce erosion.

In prior art systems oyster spat and/or oyster larvae can spawn naturally so that as the reefs grow they can be harvested recreationally. As the oysters mature and spawn, larvae will adhere to blankets where the larvae can grow together tending to form a solid piece.

In naturally occurring prior art systems much of the oyster larvae released into the wild tends to float along water currents and not grow together to form a structure that resists erosion. Instead, these oyster larvae typically end up in commercially harvested oyster beds replenishing the natural supply of oysters harvested by oyster men.

Some erosion control systems have been patented. An example is U.S. Pat. No. 4,370,075 entitled Revetment Grids and Mats which is incorporated herein by reference.

BRIEF SUMMARY

The method and apparatus solves the problems confronted in the art in a simple and straightforward manner.

Various embodiments can be used along a shoreline where an open body of water such as a gulf, lake or bay washes against the shore.

Various embodiments can also be used along channeled waterways, such as rivers, canals, streams and bayous (hereinafter referred to collectively as "waterways"), where the water washes against the sidewalls and banks through which it passes.

In one embodiment is provided is a method and apparatus having a plurality of specially configured articulating mats or blankets being substantially coated on their top surfaces with previously set oyster spat.

In various embodiments of the method and apparatus erosion preventing mats or blankets having oyster spat are placed in areas to prevent or reduce erosion.

In various embodiments the method and apparatus incorporates seeding with oyster spat and/or oyster larvae onto a blanket having rough surfaces and comprising calcium. After seeding and setting natural growth of the oyster spat can create a barrier that helps prevent erosion by breaking the kinetic energy of waves.

In various embodiments as the oysters mature and spawn, larvae will adhere to structural blankets where the larvae can grow together tending to form a structure that can resist erosion due to wave action.

In various embodiments of the method and apparatus, outside of a natural waterway, oyster spat and/or larvae can be seeded in a confined setting volume allowing for protected setting onto a base structure, and then the base structure with the now set oyster spat can be placed at a selected location for the prevention of soil erosion.

In various embodiments the base structure with previously set oyster spat, after being placed at the selected location, is allowed to have the oyster spat grow and reproduce naturally increasing the structural strength of the entire structure.

In various embodiments the base structure forming a blanket or mat can comprise a plurality of interconnected blocks which can articulate relative to each other, and wherein the blocks can comprise concrete. In various embodiments the base structure can comprise an articulating blanket or mat of a plurality of interconnected blocks held together by a cabling system.

In various embodiments the plurality of blocks can include front and rear sides with the front side having a recessed face and the rear side being substantially flat or planar. In various embodiments the recessed face provides a protected volume and area for oyster spat to set.

In other embodiments the recessed face provides protection to the oyster spat setting in the recessed area, such as where multiple mats or blankets are stacked on top of each other, In various embodiments oyster shell can be incorporated into the base structure. In various embodiments ground up oyster shell can be incorporated into aggregate of concrete blocks forming the base structure. In various embodiments fossilized oyster shells can be incorporated into the base structure. In various embodiments the amount of broken, ground or crushed oyster shell can be at least 25 percent by weight of the total weight of the concrete before water is added. In various embodiments the amount of broken, ground or crushed oyster shell can be at least 10, 15, 20, 25, 30, 35, 40, 45, and 50 percent by weight of the total weight of the concrete before water is added. In various embodiments the amount of broken, ground or crushed oyster shell can fall within a range of between any two of the above referenced percent by weight figures before water is added.

In various embodiments the oyster shells as aggregate in concrete can be screened to have an average size of 89, which refers to eights and nines for screening. In various embodiments the oyster shell used can be a mixture of ground or crushed oyster shell: (a) falling through a ¼ inch screen but stopped by a ⅛ inch screen and (b) falling through the ⅛ inch screen. In various embodiments the added broken, ground or crushed oyster shell mixture is equal in percent by weight of parts (a) and (b) broken, ground or crushed oyster shell. In various embodiments part (a) can fall within a range of between any two of the following percent by weight the added broken, ground or crushed oyster shell: 25, 30, 35, 40, 45, 50, 55, 60, 65, 70, and 75 percent by weight.

In various embodiments part (b) can fall within a range of between any two of the following percent by weight the added broken, ground or crushed oyster shell: 25, 30, 35, 40, 45, 50, 55, 60, 65, 70, and 75 percent by weight. In various embodiments parts (a) and (b) percent by weight add up to be 100 percent added broken, ground or crushed oyster shell.

In various embodiments the base structure comprising a plurality of articulating blocks can be sized to a predesignated height and width. In one embodiment the base structure comprising a plurality of articulating blocks can be 28 feet by 8 feet, and have a depth or thickness of 4 inches. It should be noted that the depth or thickness is determined based on the environmental factors seen by the base structure of plurality of articulating blocks. For example, it should be noted that where the base structure is expected to see relatively high water energy and wave action, the thickness or depth of the base structure can be increased to accommodate said increased water energy and wave action. In various embodiments the depth of the blocks can be between 4 and 9 inches.

In various embodiments, after manufacturing a plurality of mats or blankets, the mats or blankets can be transported to a predesignated loading area, and then loaded into one or more mobile remote setting facilities. In one embodiment the predesignated loading area can be a dock. In various embodiments the mats or blankets can be transported by truck, rail, or barge. In various embodiments a crane can be used to load the plurality of mats or blankets into the selected one or more mobile remote setting facilities.

In various embodiments the method of the present invention can include the following steps:

(a) providing a crushed oyster shell aggregate. In various embodiments the oyster shell aggregate can be comprised of fossilized oyster shell; and (b) incorporating the oyster shell as aggregate in an articulating base structure formed from a plurality of interconnected blocks.

In various embodiments the method of the present invention can include the following steps:

(a) providing a plurality of articulating base structure mats or blankets, each mat or blanket comprising a plurality of interconnected blocks wherein the blocks are comprised of concrete having oyster shell as aggregate;

(b) providing a mobile remote setting system having an interior, and at a first location placing the plurality of articulating base structure mats or blankets in the interior of the mobile remote setting system;

(c) moving the mobile remote setting system from the first location to a second location;

(d) at a second location placing oyster larvae in the interior of the mobile remote setting system and allowing the oyster larvae to set on the plurality of articulating base structure mats or blankets for a predefined period of time for setting; and (e) wherein after step "d" the plurality of articulating base structure mats or blankets can be removed from the interior of the mobile remote setting system and placed at a selected erosion prevention location.

In various embodiments during step "d" the plurality of mats are removed from the mobile remote setting system and placed at a selected location.

In various embodiments step "c" occurs after step "b" and the second location is remote from the first location.

In various embodiments step "d" occurs adjacent second location of step "c".

In various embodiments during step "b" the plurality of mats are vertically hung in the remote setting system. In various embodiments each of the plurality of mats are supported by a header or spreader bar for hanging in the mobile remote setting system. In various embodiments the header can include side movement limiters (e.g., an angle or other bracket) along with manual or quick release latches that will allow each of the plurality of mats or blankets to be attached and then detached from its respective header or spreader bar for hanging.

In various embodiments during step "b" each of the plurality of mats have a upper face and lower face and the mats are hung in paired sets with each lower face of the paired mats pointing towards each other.

In various embodiments the mobile remote setting system comprises an air sparging system. In various embodiments the air sparging system includes an air compressor fluidly connected to a plurality of sparging pipes, each of the sparging pipes including a plurality of sparging openings.

In various embodiments during step "b" each of the plurality of mats has a upper face and lower face and the plurality of mats are hung in paired sets with each lower face of the paired mats pointing towards each other and each upper face pointing away from each other.

In various embodiments the mobile remote setting system includes a setting interior which setting interior includes a plurality of walls and a floor. In various embodiments the sparging pipes of the air sparging system can be located next to the floor.

In various embodiments before step "c" at least part of the interior of the mobile remote setting system has placed thereon a non-stick material. In various embodiments the non-stick material can be paraffin or wax. In various embodiments the non-stick material can be sprayed onto the interior.

In various embodiments before step "c" at least part of the lower surfaces of each of the plurality of mats has placed thereon a non-stick material. In various embodiments the non-stick material can be paraffin or wax. In various embodiments the non-stick material can be sprayed onto the lower surfaces of each of the plurality of mats.

In various embodiments before step "c" filling the interior of the mobile remote setting facility with water sufficient to cover the top of the plurality of mats and sparging the water for a predetermined period of time and then removing substantially all of the water from the interior of the mobile remote setting facility.

In various embodiments during step "c" filling the interior of the mobile remote setting facility with water sufficient to cover the top of the plurality of mats and sparging the water for a predetermined period of time and then removing substantially all of the water from the interior of the mobile remote setting facility. Sparging is done in the interior to dynamically move the oyster larvae around the interior and facilitate an even set density of spat on the plurality mats or blankets. As the sparging moves the oyster larvae around the interior, they "feel" the concrete of the plurality of mats or blankets with their foot and set in place on the concrete. Without sparging moving the water column, once introduced, the larvae would tend to fall to the bottom and sets in a clump at the bottom. In various embodiments the predefined period of time ranges between 48 to 96 hours, or between 72 to 96 hours. During this sparging time period, concentrated algae can be introduced into the water in the interior to feed the larvae during setting process.

In various embodiments between step "c" and removal of the plurality of mats or blankets from the remote setting facility, the additional step of adding feed to the interior of the remote setting facility in a sufficient amount to facilitate rapid growth of the larvae after setting. Because oysters are filter feeders, water with feed flowing through the hung blankets or mats (open faced) will allow the oysters to feed naturally. In various embodiments this feeding period lasts for at least 7 days after step "c". Now that the oysters are set, they must be fed to ensure that they survive and continue to grow. Each day that they are allowed to grow in the protected environment of the interior of the mobile remote setting facility makes them that much safer from predators upon placement. In various embodiments during the feeding period water with feed for the oyster larvae is pumped into the interior of the mobile remote setting facility, while at the same time water is pumped out of the interior of the mobile remote setting facility to substantially maintain a relatively constant water level in the interior. In one embodiment a first pump with outlet is located at one end of the interior while a second pump with inlet is located at a spaced apart end of the interior. The first pump can pump water into the interior from a predetermined water source such as the location where the mobile remote setting facility is located during step "c" (e.g., a body of water such as a pond, lake, bay, ocean, and/or river). Alternatively a public water source can be used. The second pump can discharge into the same water source. The pumping of water into and out of the interior creates a flow process, allowing the water to bring natural feed in the form of algae to the oysters. Because oysters are filter feeders, the water with feed flowing through the interior and in between the sets of plurality of mats allows the oyster larvae to feed naturally. After a predetermined period of time (e.g., one week) the feeding flow is stopped and the plurality of mats with set oyster spat are ready to be removed from the interior of the mobile remote setting facility.

In various embodiments between the time the feeding flow is stopped and the plurality of mats are removed, substantially all of the water in the interior of the mobile remote setting facility is emptied and, for a predefined period of time, the plurality of mats remain hanging in the interior of the mobile remote setting facility. In various embodiments the predefined period of time is between about 1 and 14 days, more preferably between 2 and 7 days. In various embodiments during this predefined period of time a sprinkler system can be used to maintain a predesignated moisture content on the now set oyster spat on the plurality of mats.

In various embodiments after step "c" the plurality of mats are removed from the interior of the mobile remote setting facility. In various embodiments a crane with rigging can be used to remove the plurality of mats.

In various embodiments, where water depth at the project site allows navigation of the water based mobile setting facility, the mobile setting facility can be moved via water and into place immediately adjacent the selected location for ultimate placement of the plurality of mats. Alternatively, in various embodiments, where the water depth is too shallow to allow for navigation of the water based mobile setting facility, the mobile setting facility can be moved substantially as far as navigable water permits and then the plurality of mats removed from the mobile setting facility and loaded onto a vessel which can continue to navigate in the water such as a deck barge. In the instance of a deck barge the plurality of mats can be lifted by a crane barge onto the deck of the work barge.

In various embodiments, after being removed from the mobile remote setting facility, the lower surface of at least one of the plurality of mats is placed on top of at least one of the other of the plurality of mats.

In various embodiments a protective covering is placed over substantially all of the top surface of each of the plurality of mats. In one embodiment the protective covering can be a biodegradable predator net.

In various embodiments after step "c" the plurality of mats are placed in a selected location to prevent erosion. In various embodiments the selected location is the sidewall of a waterway. In various embodiments the selected location is substantially underwater.

In various embodiments a plurality of water based mobile setting facilities can be used such as for large scale erosion control projects. In these embodiments, after a first water based mobile setting facility is emptied of blankets being substantially covered with set oyster spat, it can be sent to a predesignated loading facility where the first mobile setting facility is filled again with new plurality of mats which will require being set with oyster spat. During the time period that the first water based mobile setting facility is being sent back to a predesignated loading area for refilling, being refilled, and then returning to the predesignated location for remote setting, a second water based mobile setting facility can be engaged in the process of remote setting oyster spat on a plurality of mats hung in the interior of the second water based mobile setting facility using one or more embodiments disclosed herein.

In various embodiments after placement of the processed plurality of mats or blankets at the predesignated erosion control location, the oysters on these plurality of mats or blankets will continue to grow together to form a "living blanket" which over time will combine into a solid reef of oysters.

In one embodiment, where there is death or inadequate growth of oysters after placement on the plurality of mats or blankets, the areas of death or inadequate growth can be reseeded with oyster spat for setting and growth. In this embodiment pieces of oyster shell (fossilized or freshly harvested) can be arranged in large baskets. Oyster spat can be seeded onto these shells using a remote setting process as described above. After a good set is complete, the shells with now set oyster larvae (i.e., oyster spat) can be blown overboard by barges. It is expected that the individual pieces of oyster shell would fall from the surface to the previously placed plurality of mats or blankets, and then settle into recessed areas and/or openings in the plurality of mats or blankets. This "reseeding" introduces a new set of live oyster spat onto the plurality of mats or blankets and wherein this new live oyster spat can continue to grow on the already placed plurality of mats.

In various embodiments is provided a method for preventing erosion comprising:

(a) providing crushed oyster shell aggregate; and
(b) incorporating the oyster shell as aggregate in an articulating base structure formed from a plurality of interconnected blocks, each of the blocks having top and bottom portions wherein the top portion includes a recessed interior.

In various embodiments during step "a" the oyster shell aggregate is comprised of fossilized oyster shell.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 2 is an elevational view of the cross section of waterway of FIG. 1 where wave action has eroded portions of the bank.

FIG. 3 is an enlarged view of one of the eroded banks of the waterway of FIG. 2.

FIG. 8 is a concrete encased rod which can be used in various of the method and apparatus.

FIG. 9 is a perspective view of perspective view of any of the embodiments from FIG. 4, 5, or 6 of the method and apparatus showing a partial blanket wherein the cultch retained in the pillow pockets is in the form of concrete encased rods.

FIG. 11 is a top view of the embodiment shown in FIG. 10 with a netting placed over the plurality of concave containers.

FIG. 12 is a side view of the embodiment of FIG. 11.

FIG. 13 is a side view of the embodiment of FIG. 11 showing the connecting means for the plurality of concave containers.

FIG. 24 is a schematic diagram of the sparging system.

FIG. 25 is an enlarged view of a section of one of the sparging pipes.

FIG. 26 is a perspective view of the interior of the barge schematically indicating that the walls and floor are sprayed with a non-stick surface such as paraffin.

DETAILED DESCRIPTION

Detailed descriptions of one or more preferred embodiments are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in any appropriate system, structure or manner.

Figure 1:
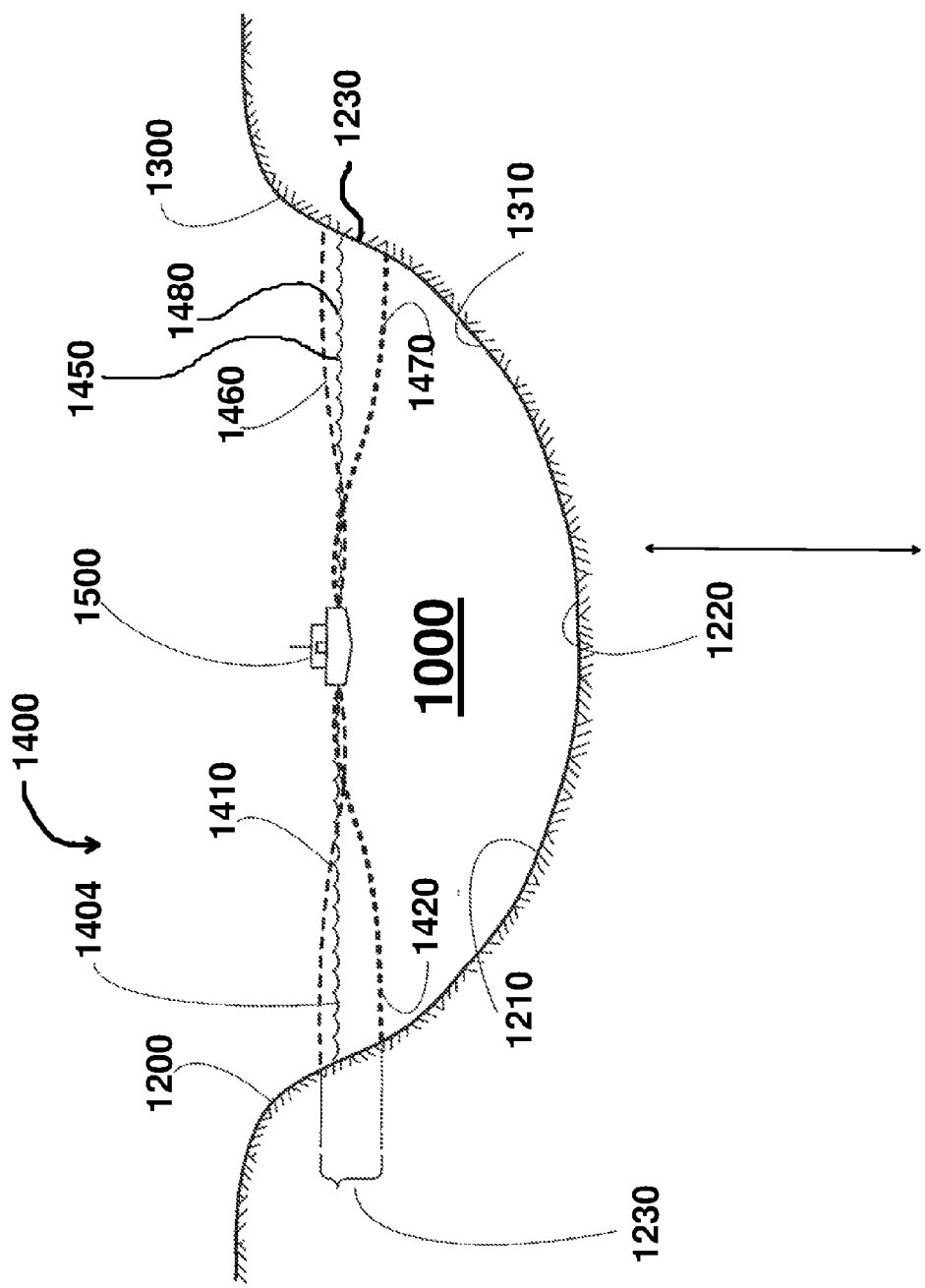
FIG. 1 is an elevational view of a cross section of waterway where the method and apparatus can be employed to prevent erosion due to wave action generated by boats and/or storms.
Figure 4:
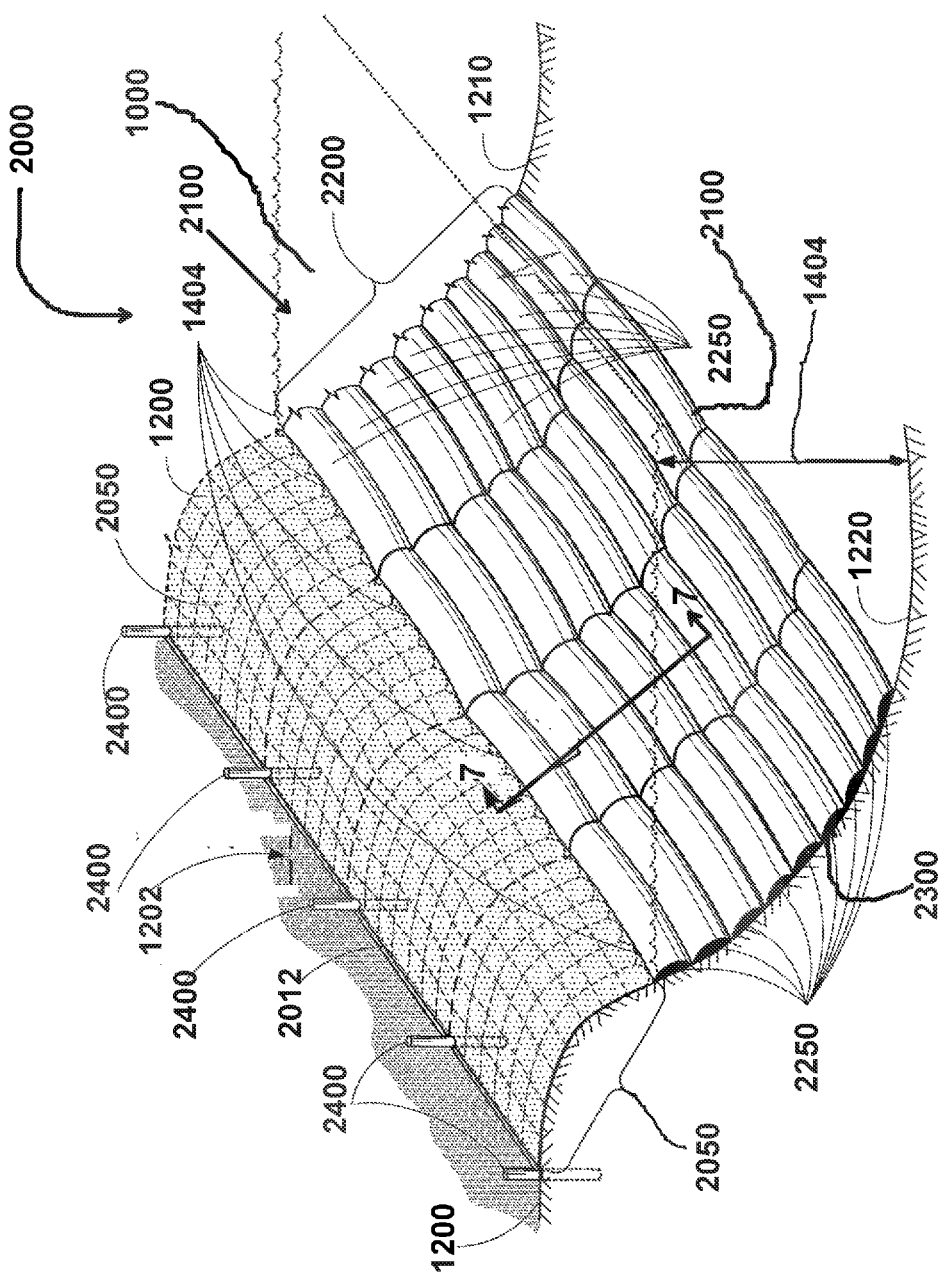
FIG. 4 is a perspective view of partial section of waterway, showing four contiguous sections (blankets) of one embodiment of the method and apparatus invention laid in place, extending from bank (where it is held in place via pilings) down the side wall of waterway, to protect against erosion.

FIG. 1 shows a typical cross section of a typical waterway 1000 (e.g., a river or canal), having a bottom (bed) 1220, sidewalls 1210, 1310 and banks 1200, 1300. As shown in FIGS. 2 and 3, the sidewalls of the waterway which are most susceptible to erosion are those portions (at risk portions 1230) which are washed up and down and back and forth by wave action of the type that is typically induced by marine vessels 1500 traversing the waterway and/or by wind-induced waves of the type which accompany storms and other inclement weather. FIG. 1 also shows waves 1400, 1450, average elevation of water 1404, wave crests 1410, 1460, wave troughs 1420, 1470, and average mean elevation 1480. As best shown in FIGS. 3 and 4, such sidewall erosion 1212 means there is less support for the bank and remaining sidewall located above the eroded portion, eventually causing it to collapse or slough off (e.g., see 1216 in FIG. 3). Waterways that are eroded in this fashion becomes wider and wider, the consequences of which are often harmful. For example, in coastal regions the widening of waterways can lead to ever increasing saltwater intrusion, which leads to the death of fresh water vegetation such as trees (e.g., live oak and cypress).

Figure 5:
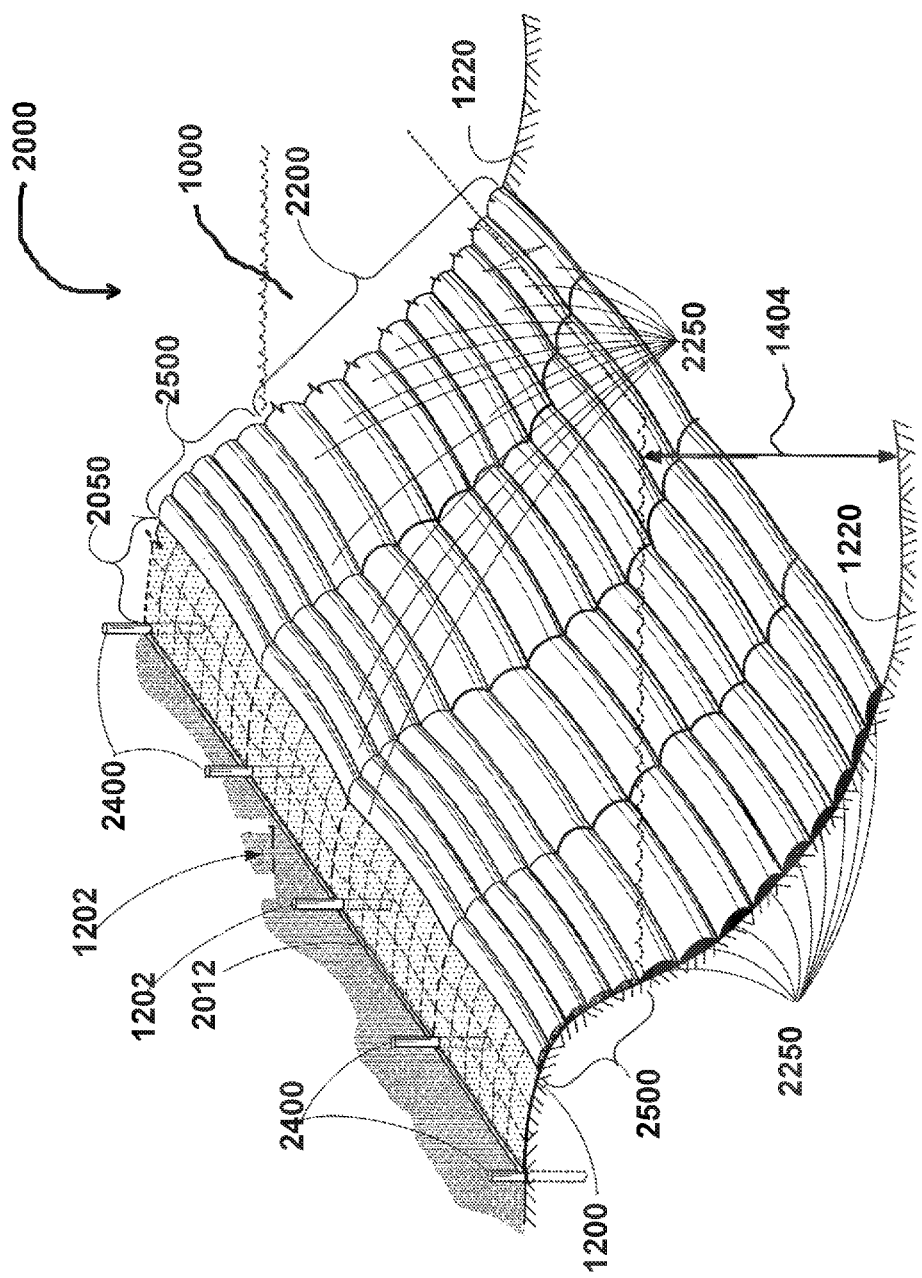
FIG. 5 is a perspective view of partial section of waterway, showing four contiguous sections (blankets) of an embodiment of the invention laid in place, extending from bank (where it is held in place via pilings) down the side wall of waterway, to protect against erosion.

FIGS. 4 and 5 show a perspective views of four contiguous sections or "blankets" 2000 of which lay in place along one side of a section of a waterway 1000. Waterway 1000 has water bottom 1220, side walls 1210, 1310 and banks at 1200, 1300. To simplify the illustration, FIGS. 4 and 5 depict blankets 2000 in place on only one side or bank 1200 of the waterway 1000. In actual use on a waterway 1000, additional blankets are also preferably placed along the other side or bank 1300 of the waterway 1000, so that both sides or banks of the waterway 1000 may be similarly blanketed to protect against erosion.

As shown in FIG. 4, each blanket 2000 may include an upper portion 2050 situated along the sidewall 1210 and bank or side 1200 above the average mean elevation 1404 of the water surface, and a lower portion 2100 situated along the sidewall 1210 of the waterway 1000 below the average mean elevation 1404 of the water surface. As also shown in FIG. 4, the blankets 2000 are sufficiently flexible so as to generally conform to the contours of the banks 1200, sidewalls 1210 and water bottom 1220 over which the blankets 2000 are laid.

Figure 7:
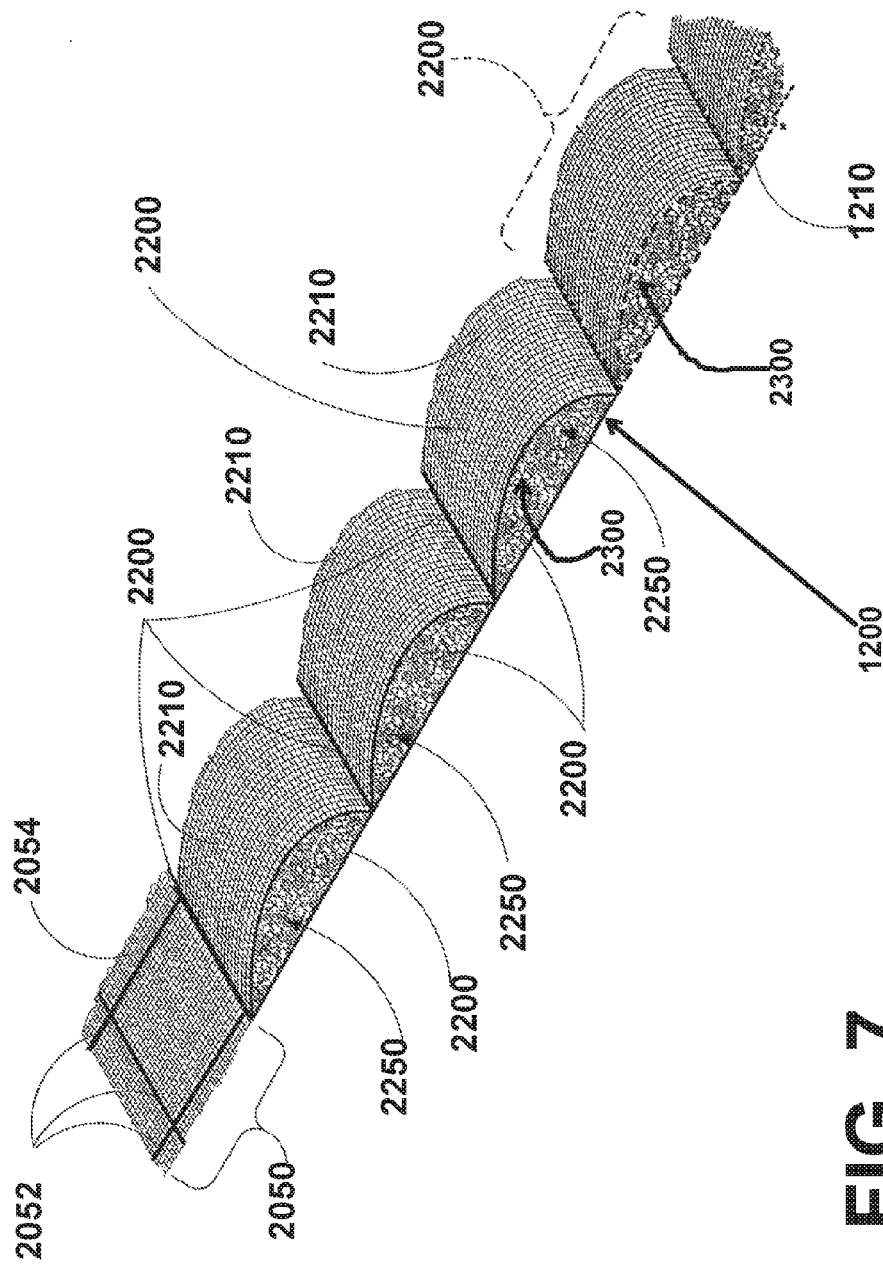
FIG. 7 is a sectional perspective view of taken along the lines 7-7 in FIG. 4 and generally represents any of the embodiments from FIG. 4, 5, or 6 of the method and apparatus showing cultch placed inside pockets serve as points of attachment for baby mollusk (or oyster larvae or "spat") to adhere to and grow on which cultch may include shells, limestone, artificial substrate, crushed concrete, calcium-coated rebar, etc.

The upper 2050 and lower 2100 portions of the blankets 2000 are preferably constructed of pliable netting 2054 material comprised of durable strands 2052 of line or wire, as for example stainless steel, galvanized metal, pvc-coated wires, monofilament and/or polypropylene line, preferably arranged in a mesh as best shown in FIG. 7. Biodegradable materials such as hemp rope may also be used as netting material, particularly in the lower portion 2100 of the mat or blanket 2000 under those circumstances where environmental or other applicable regulations may require biodegradable components below the water surface.

The lower portion 2100 of the mat or blanket 2000 preferably includes a first plurality of pockets or "pillows" 2200 which provide pockets 2250 for holding cultch 2300 therein, as shown in FIGS. 4, 5, and 7. The netting mesh forming the pillows 2200 is configured and sized so as to retain the cultch 2300 within the pockets 2250 of the pillows 2200, as shown in FIG. 7. The cultch 2300 is preferably seeded with larvae of mollusks such as oysters, which as baby mollusks ("spat") adhere to and grow on the cultch 2300. As the spat grow, they develop hard outer shells which provide an armor of protection against erosion of the sidewalls and banks of the waterway 1000 on which the lower portion 2100 of the blanket 2000 lies.

The netting mesh 2054 or other material forming the upper portion of the blanket 2000 as depicted in FIGS. 4,5, and 7 is preferably seeded with grass 1202 and/or other forms of vegetation which, when rooted and grown, serve to consolidate, stabilize and protect against erosion of the sidewalls 1210,1310 and banks 1200,1300 of the waterway 1000 on which the upper portion 2050 of the mat or blanket 2000 lays. Said seeding of the upper portion 2050 of the mat or blanket 2000 may be accomplished via spraying or other application of seeds which are mixed together with a paste or slurry that adheres to the netting mesh 2054 or other material forming the upper portion of the mat or blanket 2000. Alternatively, if desired, the upper portion 2050 of the mat or blanket 2000 may be similar to the lower portion 2100 in that said upper portion 2050 may include cultch 2300, held in the pockets of pillows 2200, which may or may not be seeded with mollusk larvae. Such an alternative embodiment of the invention may be particularly useful in an environment where the wave wash is anticipated to include a range which extends from the bottom of the water body to the top of the surrounding shoreline and/or banks.

Figure 6:
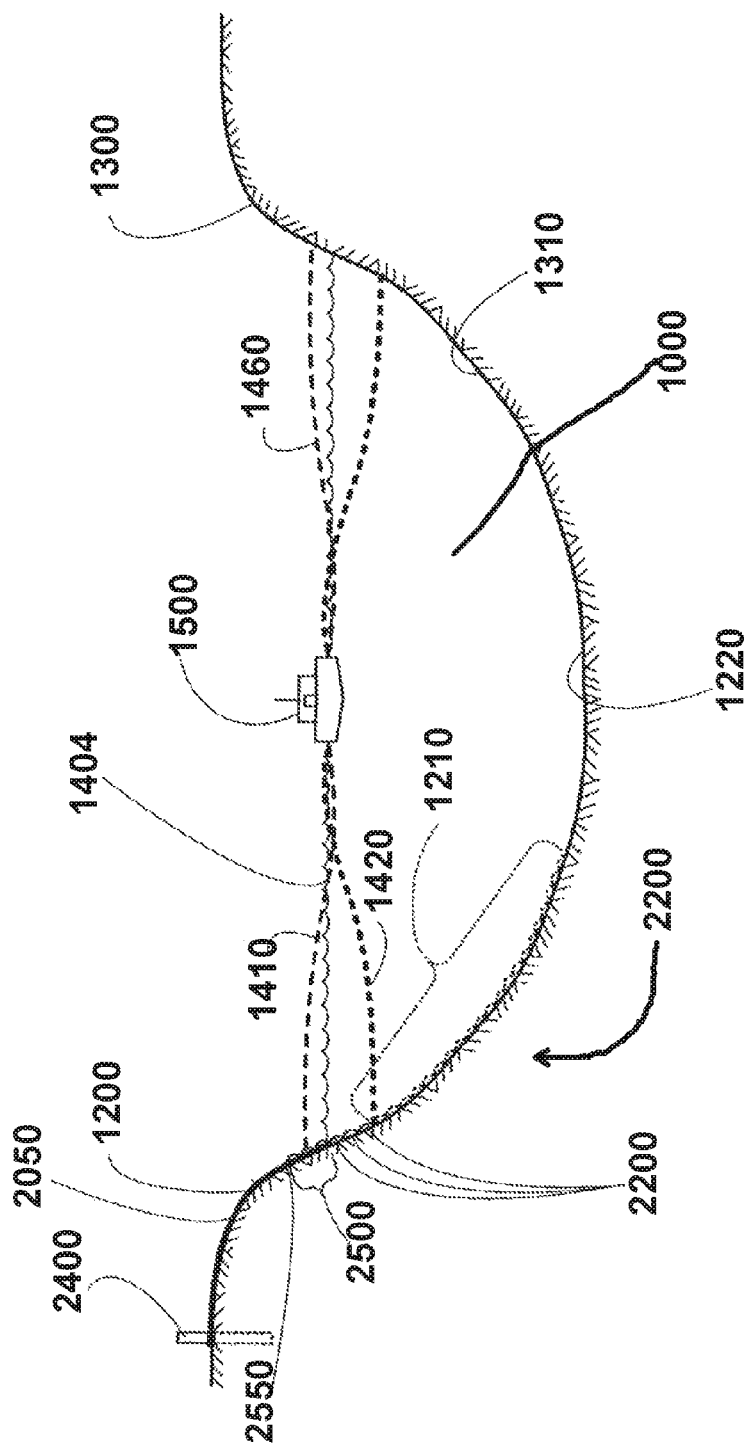
FIG. 6 is an elevational view of cross section of waterway with an embodiment from FIG. 4, 5, or 6 of the method and apparatus shown in place on left side to protect against the erosion.

The number of pillows in the lower portion 2100 of the blanket 2000 may vary as desired in accordance with circumstances and conditions. For example, if circumstances are such that sidewall erosion is expected to be limited to that portion of the sidewall located between the average mean elevation of the waterway 1000 surface and the wave trough, then it may be desirable (e.g. to minimize costs) to limit the number of pillows in the lower portion 2100 of the blanket 2000 so as to provide sidewall 1210, 1310 protection only between said average mean elevation 1404 and wave trough 1420, as shown in FIG. 6. On the other hand, if prudence and/or other circumstances make it desirable to protect more of the sidewall 1210,1310, then an additional second pocket of pillows 2500 containing cultch 2300, limestone, stones, shells, crushed concrete (mass of ground up stones/shells and/or grit) can be optionally included as indicated in FIG. 5. If circumstances warrant, the pillows 2500 can be sized, configured and provided in such number as to provide protection along the entire cross section of the waterway 1000, from one bank 1200 to the other 1300, completely covering both sidewalls 1210,1310 and the bottom 1220.

In circumstances where it is desirable to protect against erosion of the sidewalls 1210,1310 and banks 1200,1300 located above the average mean elevation 1404 of the water surface, as shown in FIGS. 2 and 3, an alternative embodiment of the invention is provided as shown in FIG. 5. This alternative embodiment may be preferable in such conditions because it may be difficult if not impossible for mollusks to grow and survive above the average mean elevation 1404 of the water, where the mollusks would be exposed rather than submerged most of the time (except perhaps during wave wash and/or high tide).

Accordingly, in the embodiment shown in FIG. 5, pillows 2500 may be provided above said average mean elevation 1404 which encase cultch 2300 and/or other material that is not seeded with mollusk larvae, as such larvae would not be likely to mature into shellfish at such location above the average mean elevation. FIG. 5 depicts those pillows 2500 encasing unseeded cultch 2300, located above the average mean elevation 1404 of the water surface and below the upper portion 2050 of the mat or blanket 2000. Those pillows 2500 preferably encase old shells, limestone, pervious concrete, artificial substrate and/or other materials which, although not seeded with mollusk larvae, nevertheless provide a "breakwater" which protects against erosion due to wave wash that may occur above the average mean elevation of the water.

The blankets shown in FIGS. 4 and 5 may be held in place along the waterway 1000's bank via piling 2400 which are driven into the bank 1200. Extending between adjacent pilings 2400 is a header 2012, said header 2012 providing for attachment of the mat or blanket 2000 thereto. Alternatively, instead of using pilings 2400, the header 2012 may be affixed to the bank 1200 via the use of anchors. To further affix the mats or blankets 2000 to the bank 1200, sprigs may be planted in the bank 1200 by inserting them through the netting mesh 2050 or other material forming the upper portion 2050 of the mat or blanket 2000.

The cultch 2300 may be comprised of various materials which provide a suitable substrate to which spat may attach and grow, such as the discarded shells of oysters and other mollusks which can be coated with a calcium carbonate solution to enhance attachment by the spat. The preferred substrate has a surface which is rough rather than smooth, as a rough-surface substrate typically provides for more and better points of attachment thereto by the spat, as compared to a smooth-surface substrate.

Cultch 2300 may also be comprised of crushed concrete, as for example crushed concrete that was once part of roadways and bridges that have been dismantled. In this way, various embodiments further enhances the environment by providing a beneficial use for crushed concrete that might otherwise be an eyesore taking up valuable landfill space. Crushed concrete and/or mollusk shells used as cultch are generally more preferably than material such as limestone, because the surface of mollusk shells and crushed concrete is generally rougher than the surface of limestone. However, shells and/or crushed concrete may not be readily available in some geographical areas, in which case other material such as limestone may be used.

The netting mesh forming the pocket pillows 2200 may be strengthened and reinforced by the use of reinforcing strands 2052 as depicted in FIG. 7. Said reinforcing strands 2052 may include those which are oriented longitudinally, as well as reinforcing strands which run at perpendicular or other angles to the longitudinal strands.

It should be understood that FIGS. 4 and 5 depict only four adjacent mat or blankets 2000 in place for purposes of illustration. In actual use, similar such mats or blankets 2000 can be placed adjacent to one another so as to provide a longitudinal blanket of protection running continuously along the desired length of the waterway 1000 to be protected.

As an alternative to the use of shells, limestone or crushed concrete, as shown in FIGS. 8 and 9 the cultch 2300 may be comprised in whole or in part of concrete encased rods 2350 or rods 2352 which have been covered with a substance 2356 which facilitates the attachment of mollusk larvae thereto. For example, metal rods 2352 of the type customarily used to reinforce concrete ("rebars") may be encased in concrete and/or coated with a solution of calcium carbonate, which provides a rough and irregular surface which attracts mollusk larvae and serves as an efficient surface facilitating the setting of mollusk larvae thereon. Such concrete-encased and/or coated rods may be placed as cultch within the pillow pockets 2200 as shown in FIG. 9, instead of an/or in addition to crushed concrete, shells, limestone and the like.

The lower portion of the mat or blanket 2000 can be designed and configured so that it does not float on the surface of the water but instead sinks into the water down to where it comes in contact with and lies on top of the sidewalls 1210,1310 and bottom 1220 of the shoreline and/or waterway 1000 which is to be protected. When properly configured and utilized, the lower portion 2100 of the mat or blanket 2000 is heavy enough to sink into the water, but not so heavy as to sink into and/or below the soil or other material comprising the sidewall 1210,1310 and bottom 1220 of the shoreline and/or waterway 1000.

FIGS. 10-14 depict an alternative embodiment of the lower portion of a blanket 2700 which is particularly suited for use along shorelines and waterway 1000s which have especially soft sidewalls 1210,1310 and/or bottoms 1220 that are unable to fully support the weight of the blankets which lay thereon. Such conditions may result in sinkage of all or part of the lower portion of the blanket into the soft sidewalls 1210,1310 and/or bottom 1220, which in turn may impede the ability of mollusk larvae and spat to adhere to and grow on the cultch contained in said lower portion of the blanket. Even if the sidewalls 1210,1310 and bottoms 1220 of the shoreline and/or waterway 1000 are firm enough to support the blanket when initially laid down, the growth and reproduction of mollusk attached to the blanket will increase its weight, such that over time it may eventually sink into and/or below said sidewalls and bottoms, and thereby become a less effective means for protecting against erosion.

As applied to such soft soil conditions, the alternative embodiment of FIGS. 10-14 provides for a lower portion of the blanket having cultch comprised of bowl-shaped containers 2750 which are preferably held within the pockets of the pillows, as shown in FIGS. 11-13. The bottom outer surface of such bowl-shaped containers 2750 is configured to provide a footprint which spreads over an area which is large enough to resist and prevent sinkage therein. The bowl-shaped containers 2750 are preferably hollow and have an open top which provides access to the interior surface 2910 of the container 2750, thereby facilitating the seeding and growth of mollusk larvae and spat within the inner portion 2910 of the container 2750.

Figure 10:
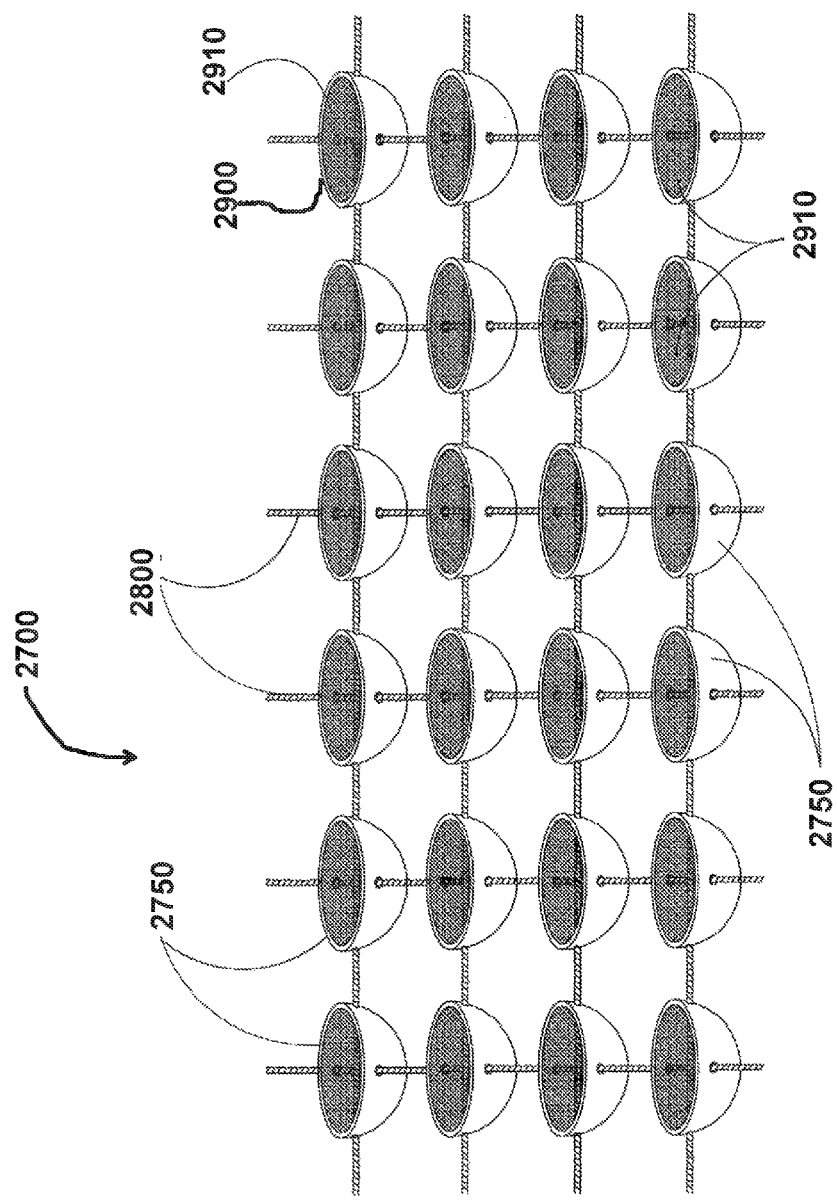
FIG. 10 is a perspective view of perspective of lower portion of blanket of an alternative embodiment of the method and apparatus especially useful for soft sidewalls and water bottoms, wherein a plurality of containers or cups are used instead of pillow pockets especially soft sidewalls and water bottoms.
Figure 14:
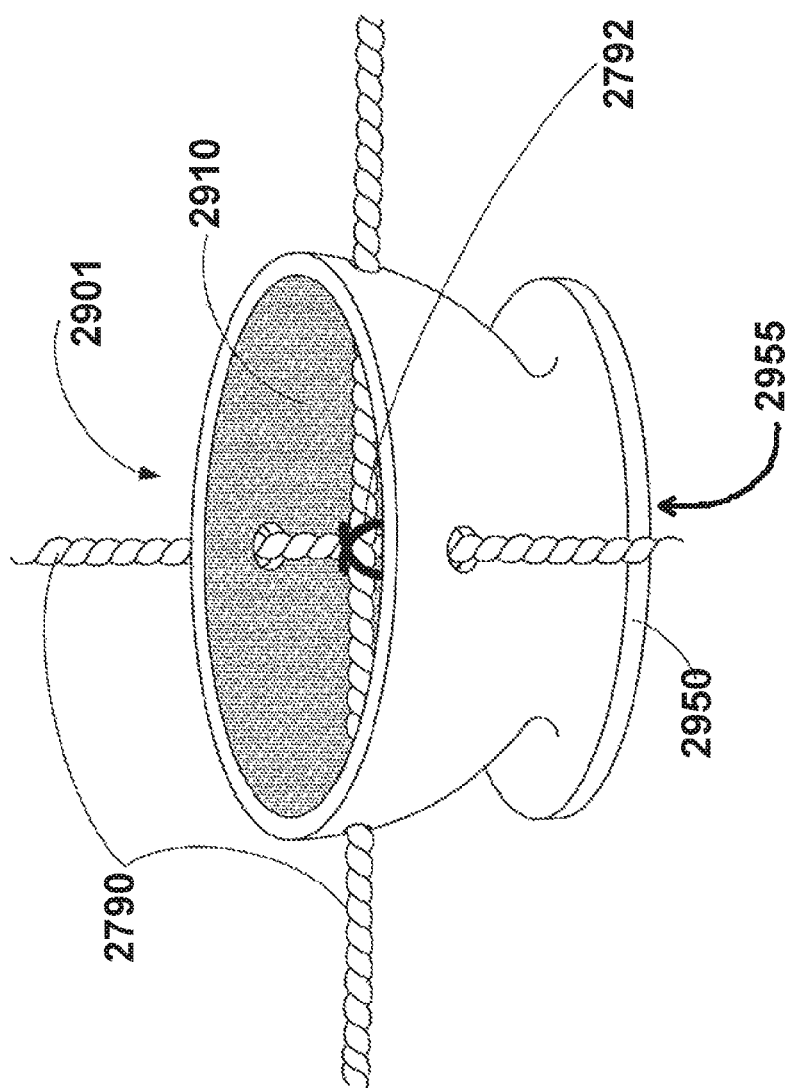
FIG. 14 is a perspective view of an alternative concave container which has a base that can be substantially planer or flat.

A multitude of containers 2750 may be connected together and arranged in a pattern such as that shown in FIGS. 10 and 11, thereby creating a blanket of such containers 2750 which can be laid over the portion of the bank 1200,1300, sidewalls 1210,1310, bottoms 1220 and/or shoreline to be protected from erosion. The containers 2750 may be of any configuration which provides a footprint that is suitably shaped and sized so as to prevent sinkage into the water bottom 1120 and sidewalls 1210,1310 on which it rests. FIG. 14 shows an alternative embodiment of a container 2901 having an enhanced footprint or base 2950 with planar bottom 2955. To facilitate the adherence of spat to the containers 2750, the inner top surface 2910 of said containers 2750 may be covered with a calcium-laced membrane or other substrate which oysters adherence and growth by spat. Containers 2900, 2901 can be connected together with cables or ropes 2790 and knotted together at 2792 as seen in FIG. 14.

Remote Setting

To facilitate, encourage and expedite the setting and early growth of spat, the blankets 2000 may be temporarily situated in an incubating environment prior to being permanently deployed along the bank 1200,1300 or shoreline to be protected. The purpose of such incubation is to provide an especially wholesome and friendly environment for the spat, thereby minimizing their exposure to predatory fish and other marine-related risks that might otherwise harm them when they are most vulnerable.

Figure 15:
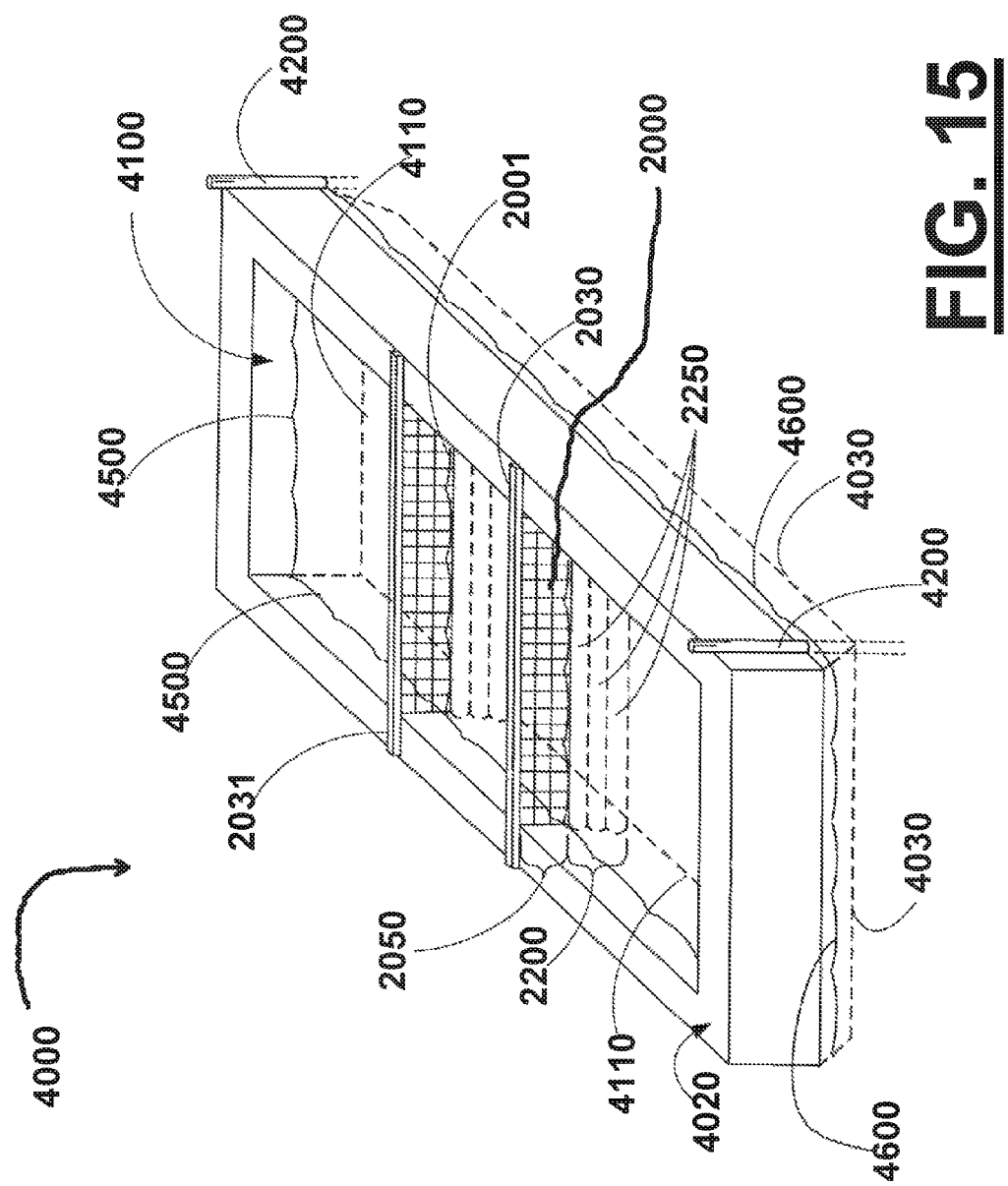
FIG. 15 is one embodiment of a remote setting land-based mobile sparging system showing blankets from one or more of the embodiments of FIG. 4, 5, or 6 of the method and apparatus.

For example, the blankets 2000 may be incubated in a hopper barge 4000. Barge 4000 can be moored in place as shown in FIG. 15. Barge 4000 can include an interior section 4100 that can hold water. The water being held within the interior section 4100 of the barge 4000 is preferably water which has been pumped in from the waterway 1000, lake or other water body where the blankets 2000 are to be deployed. Blanket headers 2030, 2031 preferably span the interior section 4100 of the hopper barge 4000, allowing the blanket 2000 to hang there such that the lower portion 2200 of each blanket 2000 can extend down into the water being held within the interior section 4100 of the barge 4000. This allows the larvae which have been seeded on the cultch 2300 in the lower portion 2200 of the blanket 2000 to grow in the relatively safe environment of the water being held within the interior section 4100 of the hopper barge 4000. Alternatively, the interior section 4100 of the hopper barge 4000 may be totally open to the body of water in which it is situated, and the bottom of said interior section 4100 of the barge 4000 may be outfitted with a screen having mesh sized sufficiently to keep out fish and other marine life most likely to prey on or otherwise endanger the spat as it grows on the lower portion 2200 of the blanket 2000. If desired, the barge 4000 with the hanging multiple blankets 2000, 2001, etc. may be temporarily sunk for purposes of incubation, then refloated afterwards.

In a preferred embodiment of the invention, the blankets 2000, 2001 are kept in an incubating environment as described above from between 6 to 60 days, during which time the spat not only gain a better foothold on the cultch but also grow larger and sturdier so as to be less vulnerable to predatory and other risks of the marine environment. For oysters, the incubation period may range from 6 to 60 days, with the most preferable period being about 30 days.

After the period of incubation, the hopper barge 4000 may be released from its moorings and moved to a desirable location near the shoreline 1200,1300 or bank where the blankets 2000 are to be deployed. Each blanket 2000 may then be lifted out of the hopper barge 4000 by a crane or other lifting means and laid down over the bottom 1220, sidewalls 1210,1310 and/or banks 1200,1300 and shorelines to be protected, as shown for example in FIG. 6.

Figure 16:
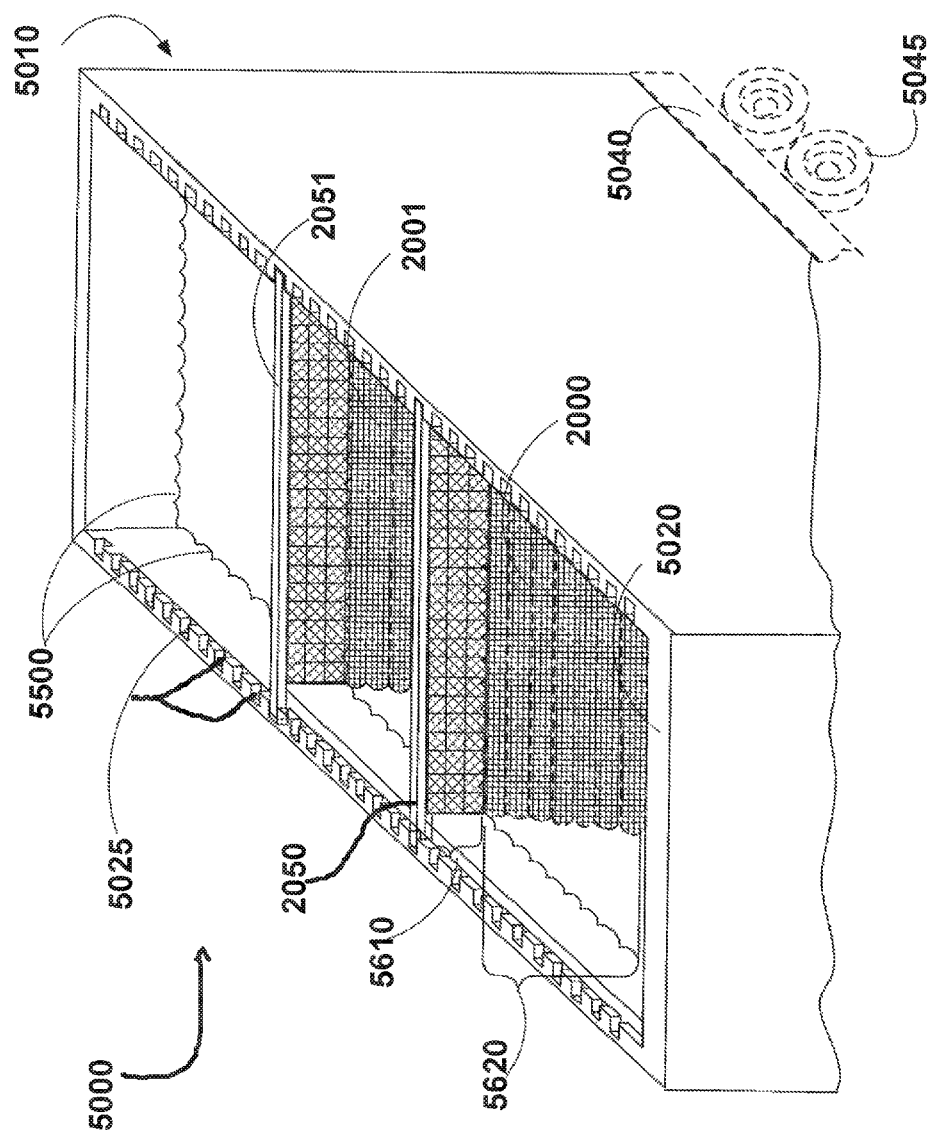
FIG. 16 is one embodiment of a remote setting water-based mobile sparging system showing blankets from one or more of the embodiments of FIG. 4, 5, or 6 of the method and apparatus.

Alternatively, the blankets 2000 may be incubated in a container 5010 (see FIG. 16) which can be transported via a trailer 5000, train or other means of transportation, as for example "frac tanks" typically used in the oil and gas industry, and/or standard-sized containers ("ISO" containers) customarily used in intermodal shipping, as shown with a removable top in FIG. 16. The water being held within container or body 5010 is preferably water that has been pumped in from the waterway 1000, lake or other water body where the blankets are to be deployed.

The blankets 2000 may be hung from one side to the other side of the barge 4000 or container 5010, as depicted in FIGS. 15 and 16. Alternatively, if desired, blankets 2000 may be hung from front to back of the barge 4000 or container 5010, thereby accommodating the use of more extended blankets 2000.

The method and apparatus is not limited to the use and growth of oyster larvae in and on the blankets 2000. Other mollusks may also be used, including mussels, depending upon the marine environment and other circumstances applicable to the particular shoreline or waterway 1000 which is to be armored by the blankets of the invention. For mussels, the incubation period referenced above may range from 6 to 60 days, with the most preferable period being about 30 days.

As indicated above, one embodiments provides for the stabilization and prevention of erosion of shorelines and banks of open bodies of water (such as lakes and bays) as well as channeled bodies of water (such as rivers, canals and bayous.) In addition to preventing erosion, the invention also provides a further benefit which is that of water clarification/purification. More specifically, it is well known that oysters, mussels and other mollusks are efficient at taking in, processing and then expelling the water in which they grow, such that the water expelled is cleaner and clearer than the water taken in.

Accordingly, various embodiments have utility for the purpose of cleaning and clarifying water which has been environmentally compromised, as e.g. water which has been contaminated with bacteria, toxins and/or other pollutants. When used for this purpose, the invention may preferably be seeded with mussels in addition and/or as an alternative to oysters, because mussels are more efficient than oysters in terms of clarifying, filtering and cleaning up the water in which they grow.

In addition or as an alternative to the above-mentioned benefits, various embodiments may also be used to facilitate the growth of oysters and other shellfish for human consumption. For example, blankets containing cultch seeded with oyster larvae may be rolled out over or otherwise laid on top of water bottoms which are located in areas and habitats which are suitable for oyster growth, reproduction and harvesting.

Various embodiments may also be used to facilitate the growth of underwater grass and/or other vegetation, as for example in storm-ravaged areas where intense wave wash has uprooted underwater plant life which is important to the habitat. In such situations, blankets 2000 seeded with underwater grass/plants may be rolled out over or otherwise laid on top of water bottoms which are located in areas and habitats which are suitable for underwater vegetation.

In general, the use and implementation of various embodiments helps to create a living shoreline of stabilized soil which resists erosion, promotes a cleaner marine environment benefitting all of the surrounding animal and plant life, and/or facilitates the growth of shellfish for human consumption.

FIGS. 17 through 39 provide an alternative embodiments of the method and apparatus of the present invention.

Figure 17:
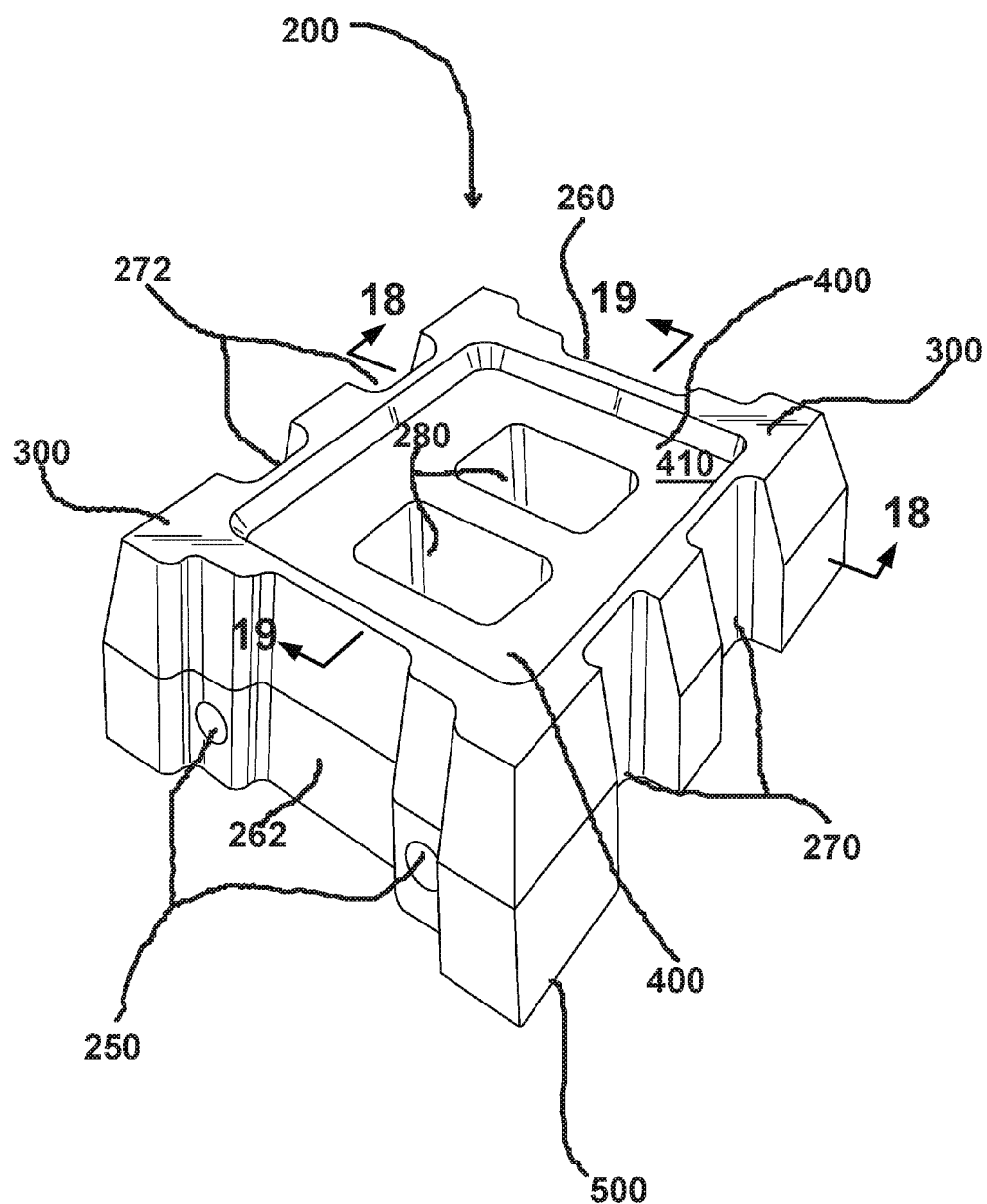
FIG. 17 is a perspective view of one embodiment of a block which can be used in fabricating a flexible concrete blanket.
Figure 18:
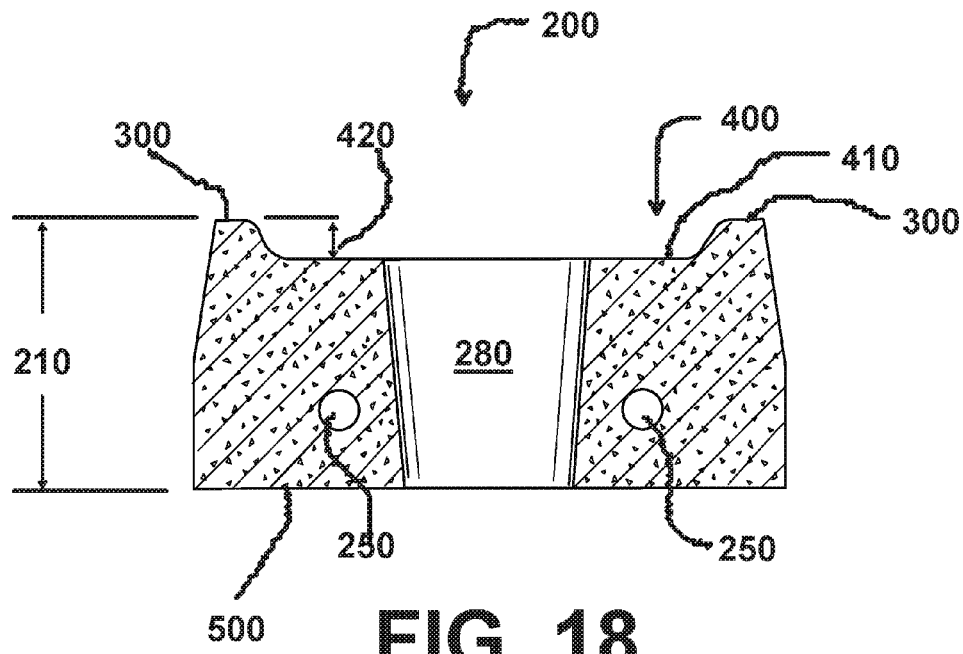
FIG. 18 is a section view of the concrete block of FIG. 17 taken along the lines 18-18.
Figure 19:
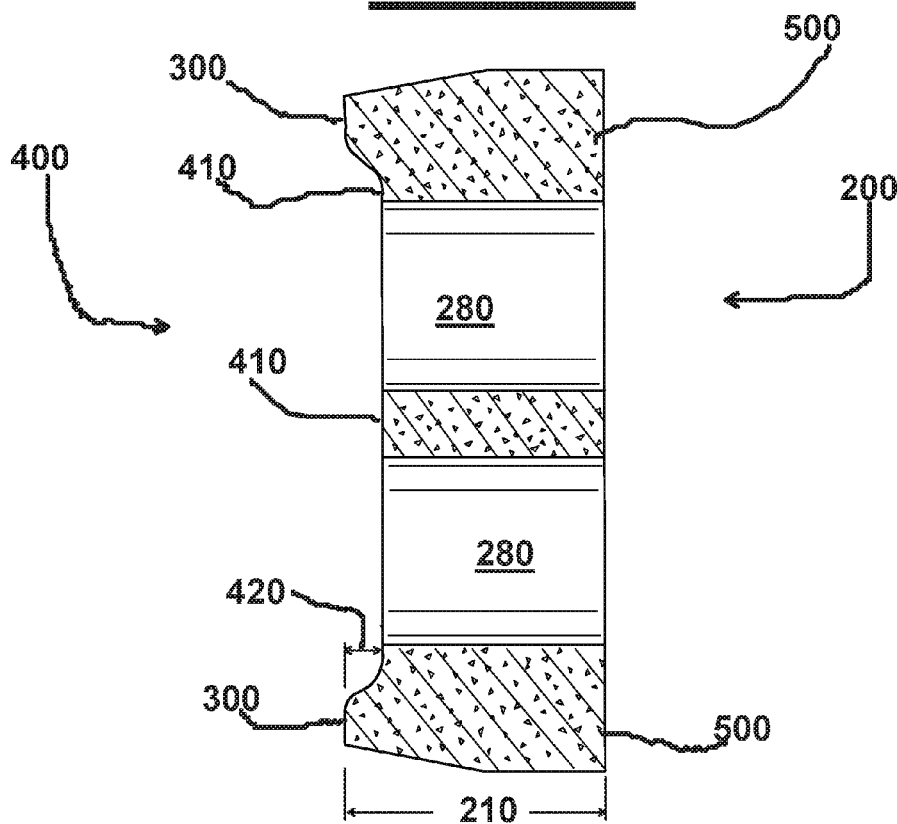
FIG. 19 is a section view of the concrete block of FIG. 17 taken along the lines 19-19.

FIG. 17 is a perspective view of one embodiment of a block 200 which can be used in fabricating a flexible concrete blanket 6000. FIG. 18 is a section view of the concrete block 200 taken along the lines 18-18. FIG. 19 is a section view of the concrete block 200 taken along the lines 19-19.

Block 200 has height 210 from lower base or bottom 500 to upper perimeter edge 300. On the top of block 200 can be recessed area 400 which has a depth 420 from lower vertical second tier surface 410 to upper perimeter edge 300. Lower base 500 can be substantially planer.

Vertical recesses 260 and 262 can be provided on the upper and lower sides of block 200. A plurality of u-shaped vertical channels 270 can be provided on the right hand side and u-shaped vertical channels 272 can be provided on the left hand side of block 200.

A plurality of vertical openings 280 can be included running from lower base 500 to lower top surface 410. As shown in FIG. 18 plurality of vertical openings 280 can be tapered from lower top surface 410 to lower base 500.

Figure 21:
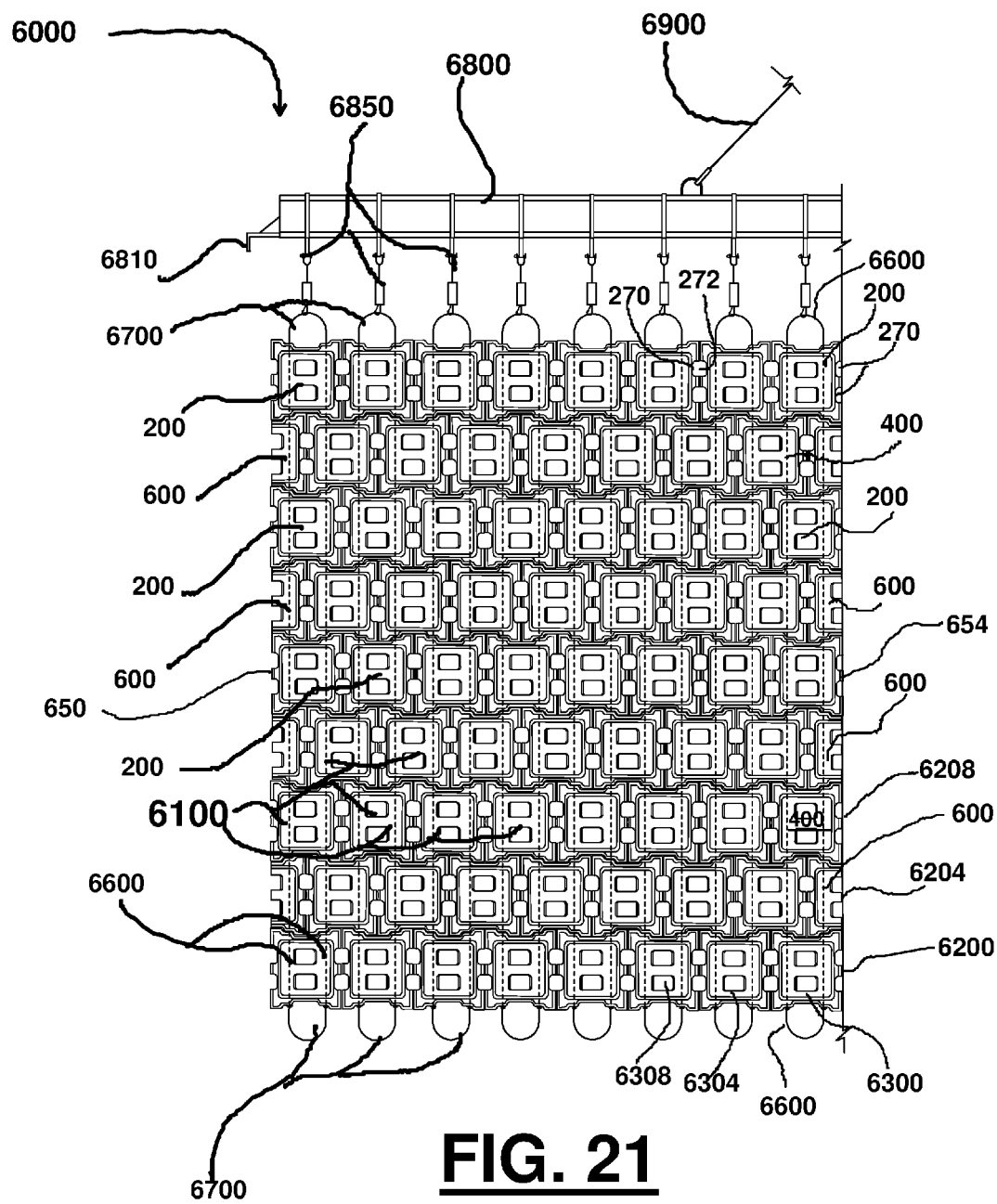
FIG. 21 is a front view of a flexible blanket fabricated out of blocks similar to FIG. 17.
Figure 22:
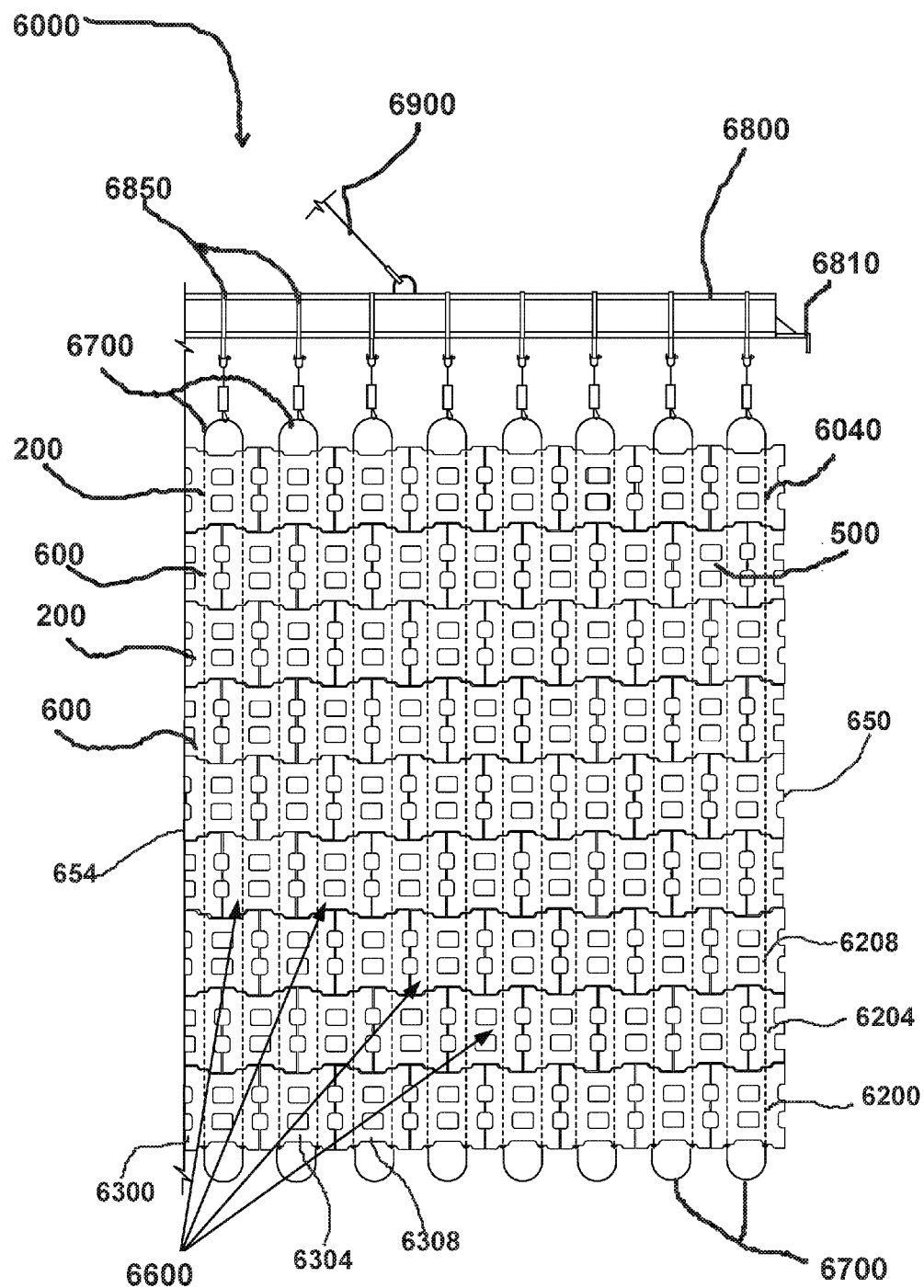
FIG. 22 is a rear view of a flexible blanket of FIG. 21.

A plurality of tunnels 250 can be provided in each block 200 to allow a plurality of these blocks 200 to be interconnected by a plurality of connecting wires 6600 as shown in FIGS. 21 and 22.

Each block can be concrete or steel reinforced concrete. During the process of forming the concrete blocks 200 that make up the mat or blanket 6000, the oyster shells can be added to as aggregate to the mixture of concrete. In various embodiments the oyster shells can be crushed, ground, or broken. In various embodiments the oyster shells can be fossilized shells. In various embodiments the amount of oyster shells as aggregate can be at least 5 percent by weight of the final cured concrete for blocks 200. In various embodiments the amount of oyster shells as aggregate can be at least 5, 10, 15, 20, 25, 30, 35, 40, 45, 50, 55, 60, 65, 70, and 75 percent by weight of the final cured concrete for blocks 200. In various embodiments the amount of oyster shells as aggregate can fall within a range of between any two of the above referenced percentages by weight of the final cured concrete blocks 200.

Recessed area 400 on each block 200 can be provided to protect oyster larvae which has been set on the block 200 from future damage or death. Recessed area 400 can have a depth 420 from lower top surface 410 to upper perimeter edge 300. In various embodiments depth 420 can be at least 5 percent of the height 210 of block 200. In various embodiments depth 420 can be at least 5, 6, 7, 8, 10, 12, 14, 16, 18, 20, 22, 24, 25, 26, 28, 30, 32, 34, 36, 38, 40, 42, 44, 46, 48, and 50 percent of height 210 of block 200. In various embodiments the depth 420 can fall within a range of between any two of the above referenced percentages of the height 210 of block 200.

Figure 20:
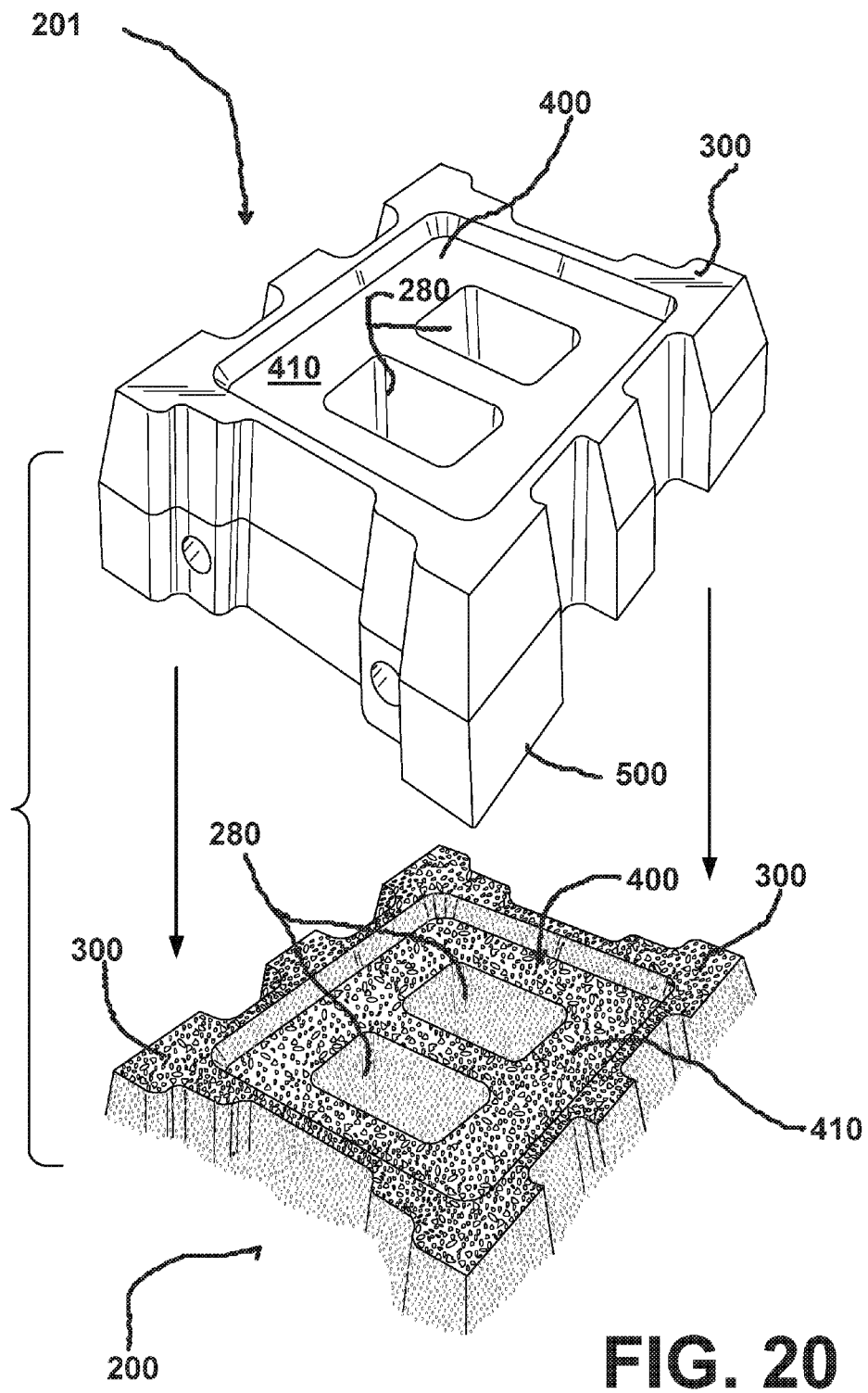
FIG. 20 is a perspective view of the block of FIG. 17 being placed on top of a lower block, the lower block having oyster spat.
Figure 36:
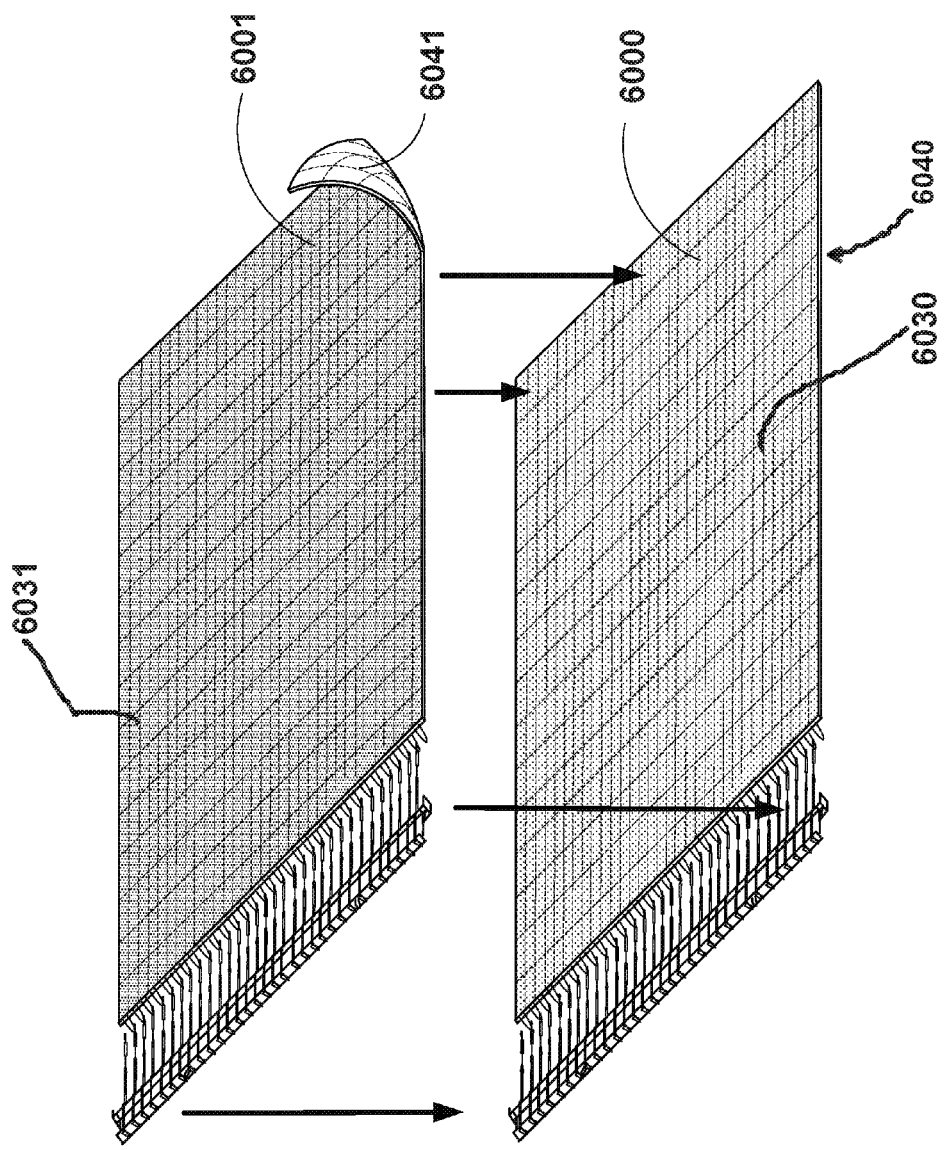
FIG. 36 is a perspective view of the showing a first flexible blanket of FIG. 21 being lowered a second flexible blanket of FIG. 22.

FIG. 20 is a perspective view of the block 200 being placed on top of a lower block 201, the lower block having now set oyster spat. It can be seen that the bottom surface 500 of upper block 200 will rest on upper surface 300 of bottom block 201. Any oyster spat located on upper surface 300 can be damaged by the weight of upper block 200. However, any located in recessed area 400 will not be damaged. Similarly, FIG. 36 is a perspective view of the showing a second flexible blanket 6001 (comprised of a plurality of blocks 200) being lowered onto a first flexible blanket 6000 (also comprised of a plurality of blocks). Any oyster spat located in the recessed areas 400 of the individual blocks 200 of first flexible blanket 600 will not be damaged.

FIG. 21 is a front view of a flexible blanket 6000 fabricated out of blocks 200. FIG. 22 is a rear view of a flexible blanket 6000. When blocks 200 are placed side by side in both horizontal and vertical directions, a blanket or mat 6000 can be formed which includes a plurality of interconnected blocks 6100 as shown in FIGS. 21 and 22. The flexible blanket 6000 shown in FIGS. 21 and 22 includes staggered rows (e.g., 6200, 6204, and 6208) of plurality of blocks, similar to staggered bricks.

As shown in FIGS. 21 and 22, a plurality of interconnecting wires 6600 can be threaded through respective tunnels 250 of particular blocks 200 thereby interconnecting the plurality of blocks 6100. Plurality of support loops 6700 can be used to structural connect adjacent interconnecting wires 6600. At the left 650 and right 654 perimeter sides of mat or blanket 6000 in alternating rows half blocks 600 can be provided to make up the gaps made by the alternating staggered rows. Half blocks 600 can be constructed the same as blocks 200 but cut along lines 19-19 as shown in FIGS. 17 and 19.

Remote Setting of Flexible Blankets

To facilitate, encourage and expedite the setting and early growth of spat, the blankets 6000 may be temporarily situated in an incubating environment prior to being permanently deployed along the bank 1200,1300 or shoreline to be protected. The purpose of such incubation is to provide an especially wholesome and friendly environment for the spat, thereby minimizing their exposure to predatory fish and other marine-related risks that might otherwise harm them when they are most vulnerable.

For example, the flexible blankets 6000, 6001 may be incubated in a remote setting water based mobile sparging system 4000 of FIGS. 23 through 27 (e.g., a hopper barge with sparging system 4700) which includes an interior section 4100 that can hold water. The water being held within the interior section 4100 of the barge 4000 is preferably water which has been pumped in from the waterway 1000, lake or other water body where the blankets 2000 are to be deployed.

Figure 23:
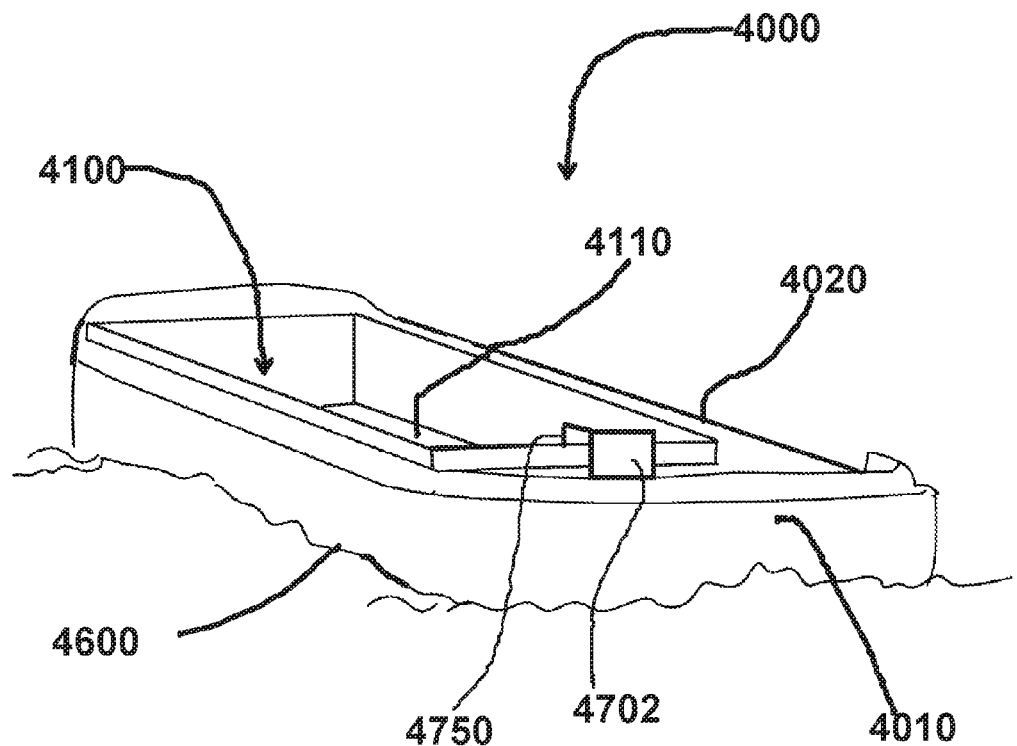
FIG. 23 is one embodiment of a remote setting water-based mobile sparging system.

FIG. 23 is one embodiment of a remote setting water-based mobile sparging system 4000. Oyster larvae can't move on their own. Without moving the water column, the larvae would collect in one spot and we would not have an even disbursement of them across the whole barge. Sparging system 4700 roils/riles the water and causes movement, agitation, and/or flow in/of the water providing a means to move the larvae about the interior 4100 for even dispersion of the larvae. In various embodiments the amount of roiling/riling can be at least 10 percent of a full roiling/riling. In various embodiments the amount can be at least 10, 10, 20, 30, 40, 50, 60, 70, 80, 90, and/or 100 percent of a full roiling/riling. In various embodiments the amount of roiling/riling can fall within a range of between any two of the above referenced percentages of full roiling/riling.

FIG. 24 is a schematic diagram of the sparging system 4700. FIG. 25 is an enlarged view of a section of one of the sparging pipes 4718. Piping 4718 is installed in four rows along the bottom floor 4110 of the barge 4000. These pipes 4718 (which includes pipes 4712, 4714, 4716, and 4718) are perforated so that air can escape. The pipes 4718 are connected to an air compressor 4702 on the deck of the barge 4000 that pushes the air through the pipes 4718. Arrows 4713, 4715, 4717, and 4719 schematically indicate that air is being pushed by compressor 4702 through pipes 4712, 4714, 4716, and 4718. This creates an aeration affect across the hopper barge and turns it into a giant setting tank.

Figure 27:
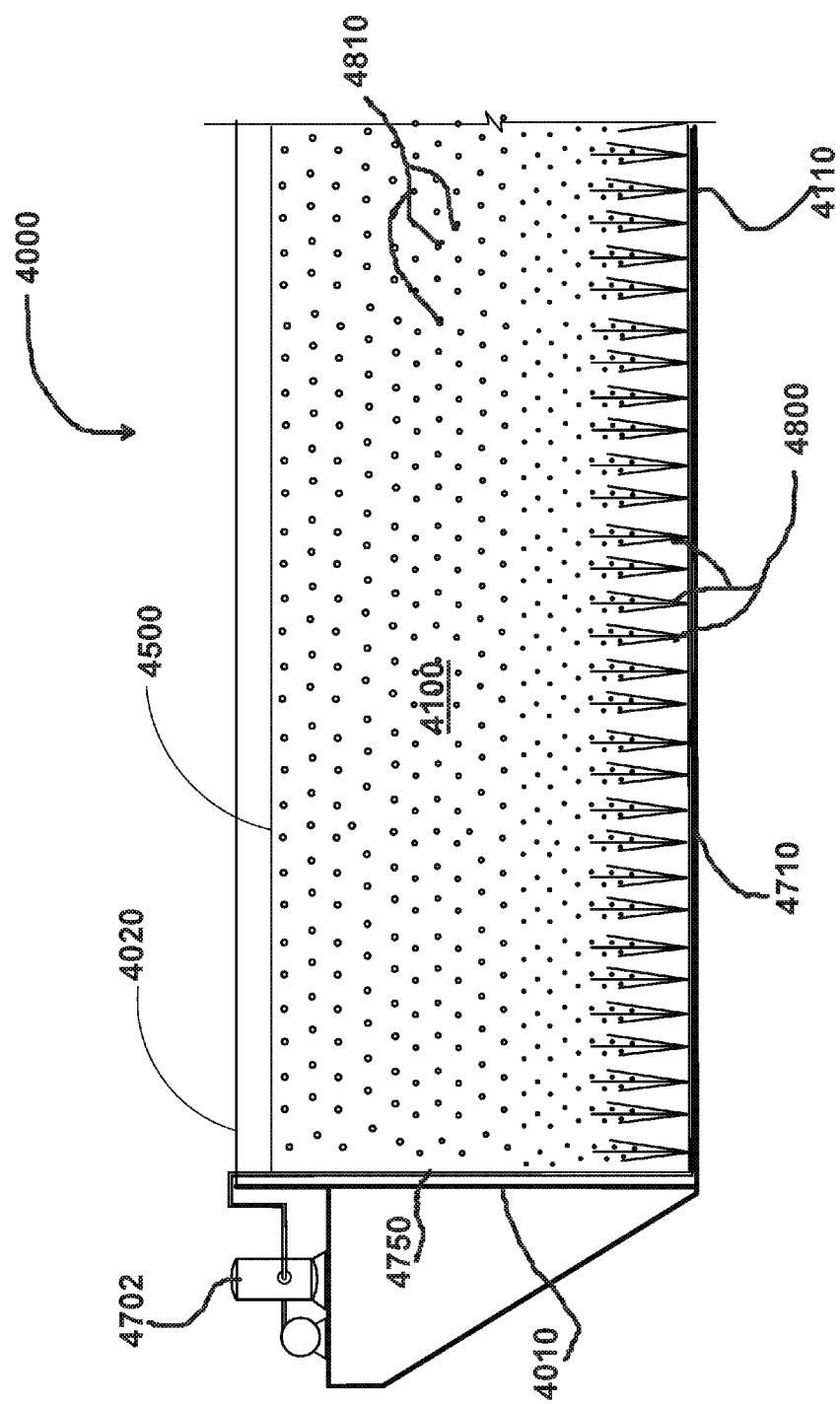
FIG. 27 is a sectional view of the remote setting water based mobile sparging system of FIG. 23 showing sparging occurring in the empty barge.

FIG. 27 is a sectional view of the remote setting water based mobile sparging system 4000 showing sparging occurring with water only in the interior 4100. Compressor 4702 pumps air into main sparging air inlet 4750, which air enters sparging pipes 4712, 4714, 4716, and 4718 and leave said pipes and enter the water in interior 4100 as plurality of jets of air 4800 and then forming plurality of sparging bubbles 4810. Plurality of jets of air 4800 and plurality of sparging bubbles 4810 will cause movement or roiling of water located in the interior 4100 of water based mobile sparging system 4000 where such movement can assist in the even distribution and setting of oyster spat placed in the water in the interior 4100.

FIG. 26 is a perspective view of the interior of the barge 4000 schematically indicating that the walls 4105 and floor 4110 are sprayed with a non-stick surface such as paraffin. The barge 4000 can be sprayed with paraffin wax on all sides and along the bottom. This spraying of wax, creates a slick surface that acts as a deterrent to oyster larvae setting along the walls of the hopper barge thereby reducing the amount of larvae that may set on the walls. Preferably, the wax is given at least 24 hours to dry before any water is introduced into the interior 4100.

Sparging Time

In a preferred embodiment, the flexible blankets 6000 are kept in an incubating environment as described above from between 6 to 60 days, during which time the spat not only gain a better foothold on the surface of the blankets but also grow larger and sturdier so as to be less vulnerable to predatory and other risks of the marine environment. For oysters, the incubation period may range from 6 to 60 days, with the most preferable period being about 30 days.

Figure 28:
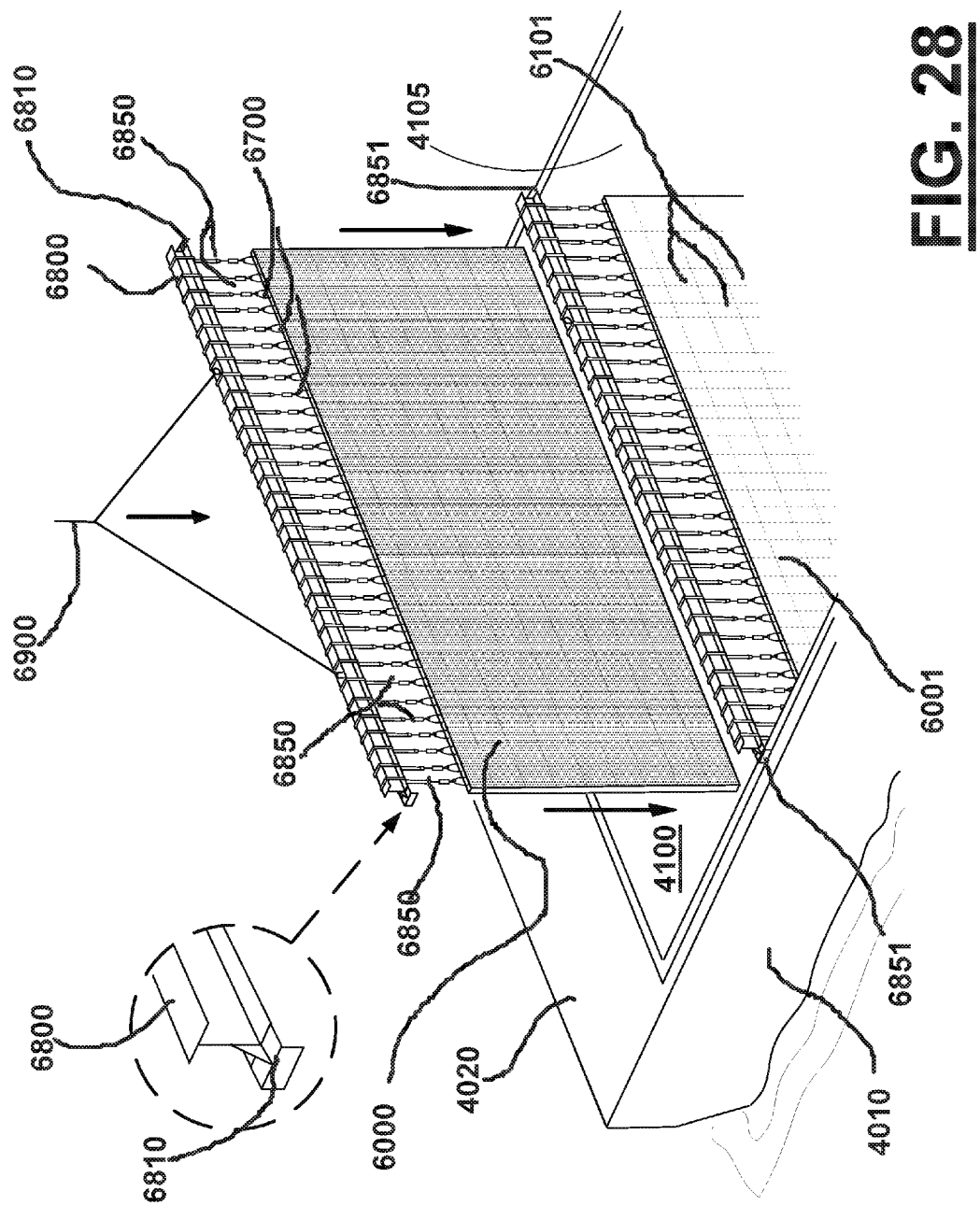
FIG. 28 is a perspective view showing the flexible blanket of FIG. 21 being lowered into the barge of FIGS. 15 and 23.

FIG. 28 is a perspective view showing a flexible blanket 6000 being lowered into the 10 barge 4000. A crane uses rigging 6900 to move blankets 6000. Each blanket 6000 can be supported by a support beam 6800 which has thereon a plurality of supporting straps 6850. At opposed ends of beam 6800 can be lateral support 6810 which lateral supports can restrict the lateral movement of hanging beam 6800 to resist the beam 6800 from slipping off of perimeter edge 4104 of interior 4100.

When the blankets 6000 are hung in the hopper barge 4000, the bottom of each blanket 6000 should be approximately 6 inches above the sparging pipes 4712, 4714, 4716, 4718 for the sparging system 4700. In one embodiment barge 4000 can hold 104, 4-inch blankets 6000, which equates to 2916 linear feet or 25,000 square feet of concrete surface.

In a preferred embodiments blankets 6000 are hung in opposing paired directions with their lower faces 6040, 6041 directed towards each other and preferably touching. Such configuration reduces the amount of space between the lower faces 6040,6040' directed towards and thereby reduces the amount of oyster larvae that may set on the lower faces 6040,6040' and increases the amount of oyster larvae that may set on the opposed upper faces 6030,6030'.

In various embodiments the number of hanging blankets or mats 6000 can be at least 5, 6, 7, 8, 10, 12, 14, 16, 18, 20, 22, 24, 25, 26, 28, 30, 32, 34, 36, 38, 40, 42, 44, 46, 48, 50, 55, 60, 65, 70, 75, 80, 85, 90, 95, 100, 110, 120, 130, 140, 150. In various embodiments the number of blankets or mats 6000 can fall within a range of between any two of the above referenced minimum numbers.

Figure 29:
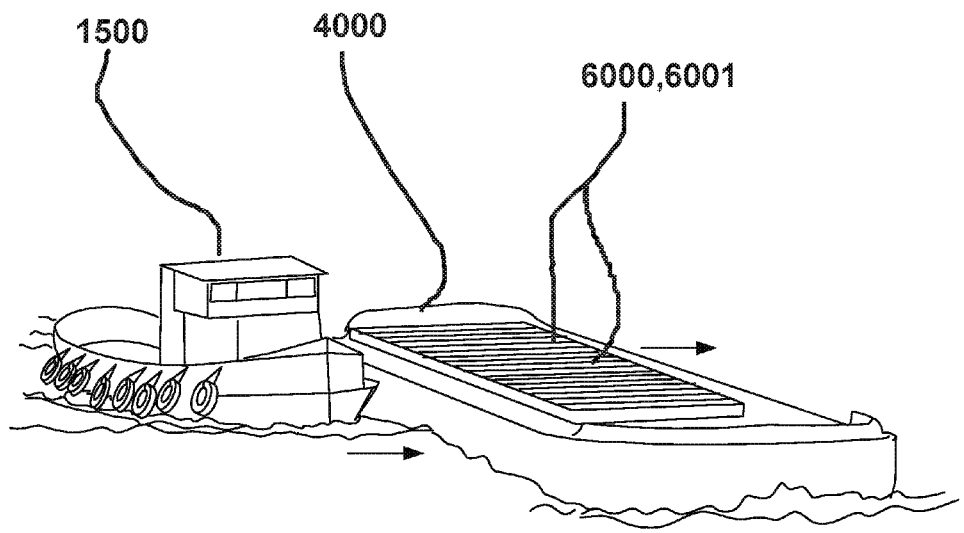
FIG. 29 is a perspective view schematically showing shipping/moving the water based mobile sparging system of FIGS. 15 and 23 containing a plurality of flexible blankets of FIG. 21.

After the plurality of blankets 6000 are hung in interior 4100 of water based mobile sparging system 4000, barge 4000 can be moved to the predesignated location for setting of the oyster larvae will occur. Once the barge 4000 is fully loaded with blankets 6000 it is pushed from the dock and placed in water with sufficient depth. The barge 4000 can be moved to the predetermined location, by spud poles, a tugboat, or a spud barge Preferably, this predesignated location will be adjacent the designated location for placement of the plurality of blankets 6000. FIG. 29 is a perspective view schematically showing shipping/moving the water based mobile sparging system 4000 (schematically indicated by the arrow) containing a plurality of flexible blankets 6000. During transport or shipping preferably interior 4100 is not filled with water.

Figure 30:
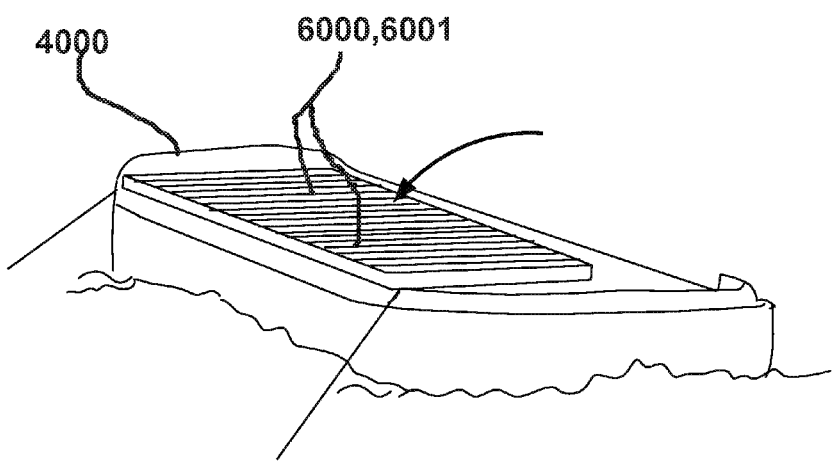
FIG. 30 is a perspective view schematically the water based mobile sparging system of FIGS. 15 and 23 now set in place and ready to engage in the process of remotely setting oyster spat.

FIG. 30 is a perspective view schematically showing water based mobile sparging system 4000 now set in place and ready to engage in the process of remotely setting oyster larvae. Prior to emplacement, water quality can be checked for salinity to ensure that historically the selected area for placement of the seeded flexible blankets 6000 is conducive to oyster growth. The area can be reconnoitered and water samples taken to assess salinity and water quality.

Sparging Process

Figure 31:
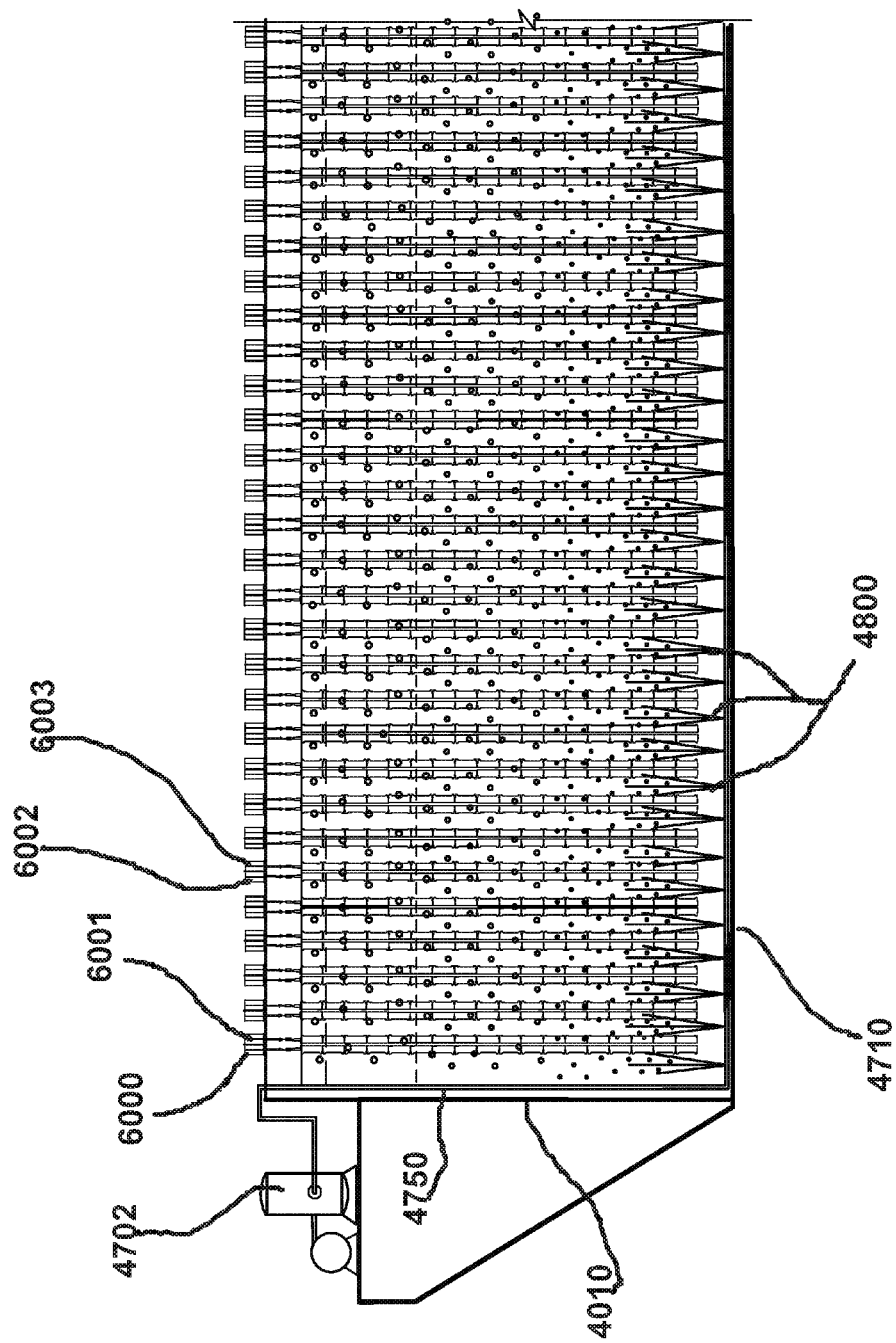
FIG. 31 is a sectional view of the remote setting water based mobile sparging system of FIGS. 15 and 23 showing sparging occurring with the barge filled with a plurality of blankets of FIG. 21.
Figure 32:
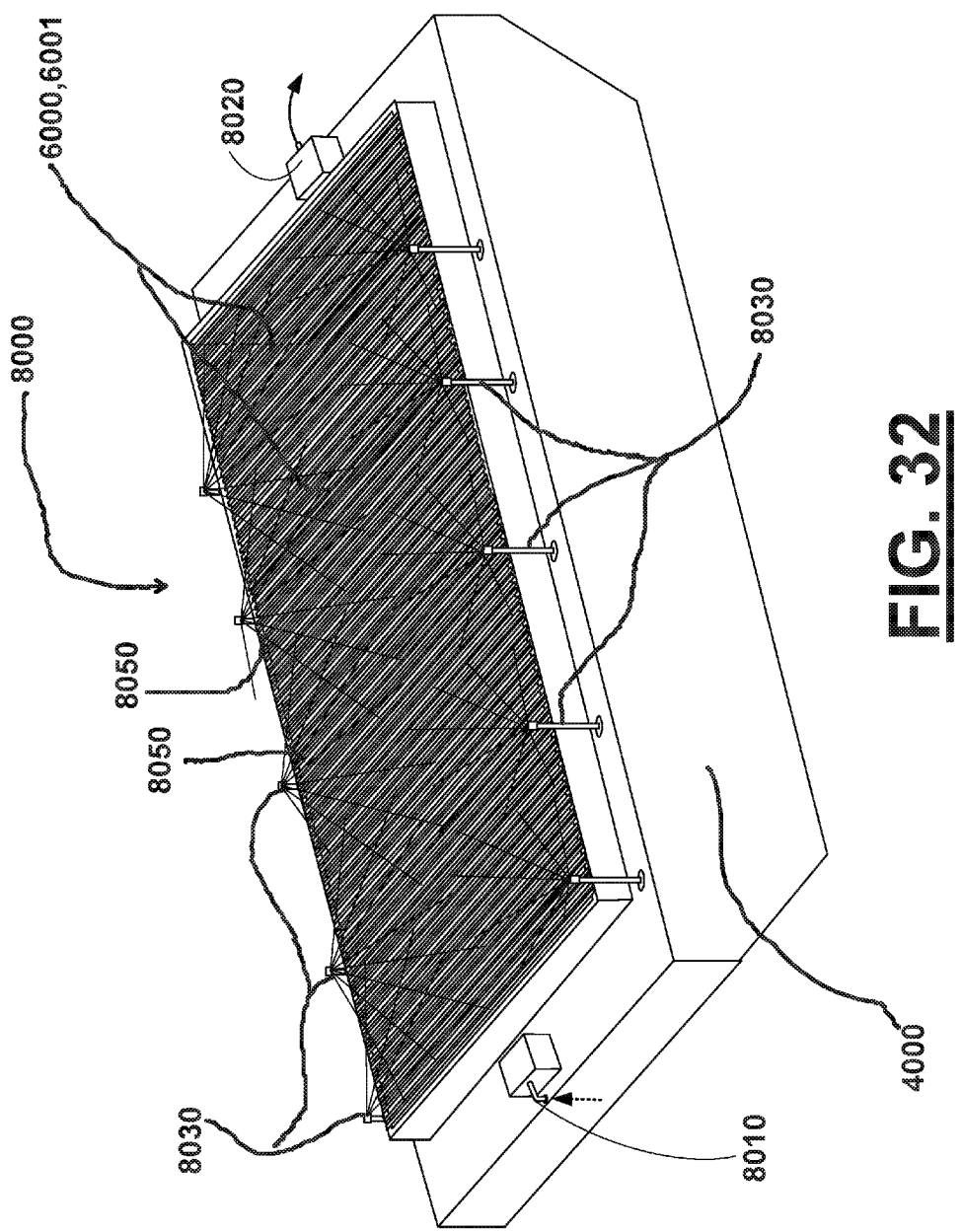
FIG. 32 is a perspective view of the water based mobile sparging system of FIGS. 15 and 23 with a sprinkler system to keep wet remotely set blankets after water had been drained from the barge.

Once located at the selected sparging location, sparging operations can begin. FIG. 31 is a sectional view of the remote setting water based mobile sparging system 4000 showing sparging occurring with the barge filled with a plurality of blankets 6000.

The barge 4000 is then filled with water. Once the water in the interior 4100 for the hopper barge 4000 has reached a depth that completely covers all blankets 6000 the water pump is turned off and the sparge system 4700 is turned on. This is so the concrete in the blankets 6000 can be cured by the salt water.

The sparging water conditions the blankets 6000 and allows them to be ready to receive oysters larvae upon setting. The concrete in the blankets 6000 is allowed to be cleaned and conditioned for a minimum of 24 hours, but can go as long as 48 hours.

In various embodiments during the cleaning and conditioning process the sparging is such that sparging bubbles rise all the way to the top of the water. In various embodiments at least 5 percent of the sparging bubbles rise to the top. In various embodiments least 5, 6, 7, 8, 10, 12, 14, 16, 18, 20, 22, 24, 25, 26, 28, 30, 32, 34, 36, 38, 40, 42, 44, 46, 48, 50, 60, 70, 75, 80, and 90 percent of the sparging bubbles rise to the top. In various embodiments the percentage of sparging bubbles which rise to the top of the water can fall within a range of between any two of the above referenced percentages.

Having the sparging system 4700 on while cleaning and conditioning, provides surface action that helps clean and condition the concrete in the blankets 6000.

Once the cleaning conditioning process is complete, the water in the interior 4100 is fully drained out of the barge 4000 by reversing the pump flow, and draining all water back into the ocean. The barge 4000 and blankets 6000 are now ready to begin the process of setting. Once the interior 4100 is empty of water, all hanging blankets 6000 can be visually inspected, looking for anything on them that could harm the oysters larvae or anything that looks out of place. Once it is determined that the blankets 6000 appear ready for setting, the interior 4100 is refilled with water.

In various embodiments at least part of the interior 4100 of the mobile remote setting system 4000 has placed thereon a non-stick material. In various embodiments the non-stick material can be paraffin or wax. In various embodiments the non-stick material can be sprayed onto the interior walls.

In various embodiments at least part of the lower surfaces 6040 of each of the plurality of mats 6000 has placed thereon a non-stick material. In various embodiments the non-stick material can be paraffin or wax. In various embodiments the non-stick material can be sprayed onto the lower surfaces of each of the plurality of mats.

When all blankets 6000 are completely covered with water in the interior 4100, the water flow is stopped. Because of weight capacity of the barge 4000, preferably the water cover is less than 3-4 inches above the top of the blankets 6000. When the filling water flow is turned off, the sparging system 2700 is turned on. Once the water in the interior 4100 has come to a full roil, the oyster larvae can be introduced into the interior 4100. Eyed larvae preferably are seeded between 1000-2000 eyed larvae per square foot of concrete area of the blankets 6000 being hung in the barge 4000 to be covered with spat.

In various embodiments the amount of oyster larvae introduced into the interior can be at least 750 oyster larvae per square foot of area on which the oyster larvae are to set on the blankets 6000. In various embodiments the lower faces 6040 of the blankets 6000 are not used in the calculation of the total surface area on which the oyster larvae are to set on the blankets 6000 in calculating the amount of oyster larvae per square foot. In various embodiments the outer perimeter dimensions of the upper face 6030 control for calculating the total surface area on which the oyster larvae are to be set on the blankets 6000 for oyster larvae per square foot of surface (here a rough calculation of surface are for oyster larvae setting can be easily calculated based on the external perimeter dimensions of each blanket 6000— which for ease of calculation ignores, even though oyster larvae will set thereupon, the internal surface area of the openings 280, sides of the walls leading to the recessed area 400, and sides of each of the concrete blocks 200). This simplified calculation of surface area will be called "simplified upper face surface area." In various embodiments at least 750 oyster larvae will be added to the interior 4100 for each square foot of simplified upper surface area. In various embodiments at least 250, 300, 350, 400, 450, 500, 550, 600, 650, 700, 750, 800, 900, 1000, 1100, 1200, 1300, 1400, 1500, 1600, 1700, 1800, 1900, 2000, 2100, 2200, 2300, 2400, 2500, 2600, 2700, 2800, 2900, and/or 3000 oyster larvae will be added to the interior 4100 for each square foot of simplified upper surface area. In various embodiments the amount of oyster larvae added to the interior 4100 can fall within a range of between any two of the above referenced minimum amount of oyster larvae added to the interior 4100 for each square foot of simplified upper surface area.

In various embodiments the predefined period of time for sparging after introducing the oyster larvae can be at least 48 hours. In various embodiments the predefined time period after introducing the oyster larvae can be at least 48, 50, 55, 60, 65, 70, 72, 75, 80, 85, 90, 95, 96, 100, 110, 120, 130, 140, and 150 hours. In various embodiments the predefined time period for sparging after introducing the oyster larvae can fall within a range of any of the above two minimum predefined time periods for sparging after introducing the oyster larvae.

FIG. 31 shows a plurality of sparging jets 4710 creating a plurality of sparging bubbles which roil and cause movement in the interior 4100 water which in turn causes movement of the oyster larvae introduced into the interior 4100. Preferably, the eyed larvae are placed in the interior 4100 water for seeding. When larvae become ready to set (i.e., hot larvae), which occurs at approximately the two week mark, they have grown an eye and a foot. The eyed larvae ready to set can be collected at a hatching facility and provided to the barge 4000 in a cooled down semi-hibernation state. The cooled temperature of the eyed larvae should be greater than freezing (as freezing would kill the larvae) and preferably about 38 degrees F. In various embodiments the range can be between 32.1 degrees and 45 degrees F. In various embodiments the temperature can fall within a range of between any two of the following temperature points: 32.1, 33, 34, 35, 36, 37, 38, 39, 40, 41, 42, 43, 44, and 45 degrees F. The cooled eyed larvae can be slowly warmed to ambient temperature to avoid shocking the eyed larvae by a too large temperature gradient (such as by introducing the larvae to warmer water and stirring the mixture of water and larvae). For example the warming period can be between 2 to 4 hours. Once the eyed larvae have been brought to substantially the same temperature of the water in the interior 4100, the eyed larvae can be introduced into the interior 4100. When the eyed larvae are dropped into the interior 4100 they would tend to fall to the floor 4110, but the sparging jets 4800 and bubbles 4810 causing the interior 4100 water to roil and move tends to evenly distribute the eyed larvae through the interior 4100 and thereby evenly distribute setting of these eyed larvae on the plurality of blankets 6000 hung in the interior 4100. In one embodiment barge 4000 can hold 104, 4-inch blankets 6000, which equates to 2916 linear feet or 25,000 square feet of concrete surface. For this amount of concrete, 25 million to 50 million larvae must be introduced.

In various embodiments during the larvae setting process the sparging is such that sparging bubbles rise all the way to the top of the water. In various embodiments at least 5 percent of the sparging bubbles rise to the top. In various embodiments least 5, 6, 7, 8, 10, 12, 14, 16, 18, 20, 22, 24, 25, 26, 28, 30, 32, 34, 36, 38, 40, 42, 44, 46, 48, 50, 60, 70, 75, 80, and 90 percent of the sparging bubbles rise to the top. In various embodiments the percentage of sparging bubbles which rise to the top of the water can fall within a range of between any two of the above referenced percentages.

In various embodiments the average size of each of the plurality of openings in the sparging system can be about $\frac{1}{16}$ inch in size. In various embodiments the average size of the plurality of sparging openings can be about $\frac{1}{128}$, $\frac{1}{64}$, $\frac{1}{32}$, $\frac{1}{16}$, $\frac{1}{8}$, and $\frac{1}{10}$ inches. In various embodiments the average size of the plurality of sparging openings can fall within a range of between any two of the above reference average sizes.

In various embodiments the spacing between the plurality over sparging openings can be sized so that the sparging openings tend to fall between sets of blankets 6000 being hung. In various embodiments this spacing can be 2 feet. In various embodiments the average spacing can be the depth of a blanket 6000 plus 25 percent. In various embodiments the average spacing can be the depth of two blankets 6000 plus 25 percent. In various embodiments the spacing between the sparging openings can be about 2 feet. In various embodiments the upper surface of the barge can include a series of indicia indicating where blankets are to be hung causing the blankets, when hung based on the indicia, to fall between sparging openings in the plurality of sparging openings.

In various embodiments each of the plurality of openings can emit an average of at least 200 bubbles per minute during sparging. In various embodiments each of the plurality of openings can emit an average of at least 50, 100, 150, 200, 250, 300, 350, 400, 450, and 500 bubbles per minute. In various embodiments each of the plurality of openings can emit an average number of bubbles per minute that fall within a range of between any two of the above referenced average number of bubbles per minute.

After the predesignated time period for sparging has elapsed, the interior 4100 water can be drained.

In various embodiments the mobile remote setting facility 4000 with water sufficient to cover the top of the plurality of mats 6000 and sparging the water for a predetermined period of time and then removing substantially all of the water from the interior 4100. Sparging is done in the interior to dynamically move the oyster larvae around the interior 4100 and facilitate an even set density of spat on the plurality mats or blankets 6000. As the sparging moves the oyster larvae around the interior 4000, they "feel" the concrete of the plurality of mats or blankets 6000 with their foot and set in place on the concrete. Without sparging moving the water column, once introduced, the oyster larvae would tend to fall to the bottom of the interior 4100 and set in a clump at the bottom.

In various embodiments the predefined period of time for sparging after introducing the oyster larvae ranges between 48 to 96 hours, or between 72 to 96 hours. During this sparging time period, algae (e.g., concentrated algae) can be introduced into the water in the interior 4100 to feed the oyster larvae during setting process. In various embodiments the predefined period of time for sparging after introducing the oyster larvae can be at least 48 hours. In various embodiments the predefined time period after introducing the oyster larvae can be at least 48, 50, 55, 60, 65, 70, 72, 75, 80, 85, 90, 95, 96, 100, 110, 120, 130, 140, and 150 hours. In various embodiments the predefined time period for sparging after introducing the oyster larvae can fall within a range of any of the above two minimum predefined time periods for sparging after introducing the oyster larvae.

In various embodiments the amount of concentrated algae added can be at least 2 liters of 3 million cell per milliliter per day per million oyster larvae.

In various embodiments, after sparging is stopped but before the plurality of mats or blankets 6000 are removed from the interior 4100 from the remote setting facility 4000, the additional step is performed of adding feed to the interior 4100 in a sufficient amount to facilitate rapid growth of the larvae after setting (i.e., feeding the oyster spat). Because oysters are filter feeders, water with feed flowing through the plurality of hung blankets or mats 6000 (open faced) will allow the oyster spat to feed naturally. In various embodiments this feeding period lasts for at least 7 days after sparging is stopped. Now that the oyster larvae are set, they must be fed to ensure that they survive and continue to grow. Each day that the oyster spat is allowed to grow in the protected environment of the interior 4100 of the mobile remote setting facility 4000 makes them that much safer from predators upon placement. In various embodiments during the feeding period water with feed for the oyster spat is pumped into the interior 4100, while at the same time and at a spaced apart location water is pumped out of the interior 4100 to substantially maintain a relatively constant water level in the interior 4100 during the feeding process. In one embodiment a first pump 8010 with inlet is located at one end of the interior 4100 while a second pump 8020 with outlet is located at a spaced apart end of the interior 4100. The first pump 8010 can pump water into the interior 4100 from a predetermined water source such as the location where the mobile remote setting facility 4000 is located during the remote setting process (e.g., a body of water such as a pond, lake, bay, ocean, and/or river). Alternatively a public water source can be used. The second pump 8020 can discharge into the same water source. The pumping of water into and out of the interior 4100 creates a flow process, allowing the water to bring natural feed in the form of algae to the oyster spat. Because oysters are filter feeders, the water with feed flowing through the interior 4100 and in between the sets of plurality of mats 6000, 6000' allows the oyster spat to feed naturally with the nutrients included in the newly introduced water. After a predetermined period of time (e.g., one week) the feeding flow is stopped, the interior 4100 water drained, and the plurality of mats 6000 with oyster spat are ready to be removed from the interior 4100 of the mobile remote setting facility 4000 and placed onto a predesignated location to prevent or resist soil erosion. During this time period of pumping water in various embodiments no additional food is added to the interior 4100.

In various embodiments between the time the feeding flow is stopped and the time the plurality of mats 6000 are removed their hanging state, substantially all of the water in the interior 4100 of the mobile remote setting facility 4000 is emptied and, for a predefined period of time, the plurality of hanging mats 6000 remain hanging in the interior 4100 of the mobile remote setting facility 4000. In various embodiments the predefined period of time can be substantial causing risking that a substantial percentage of the oyster spat will die. In various embodiments during this predefined period of time a sprinkler system 8000 can be used to maintain a predesignated moisture content on the plurality of hanging mats 6000 with oyster spat.

After the setting process the plurality of hanging mats 6000 with oyster spat can now be placed at a predesignated installation location.

Figure 37:
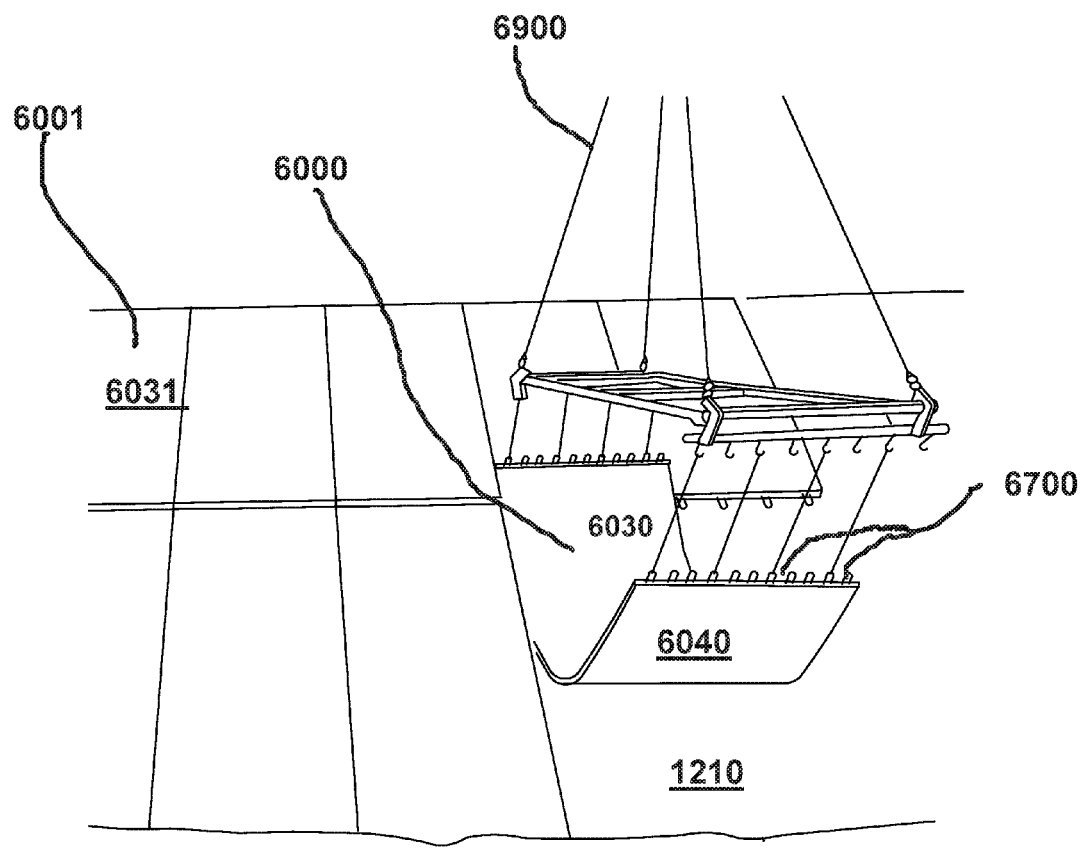
FIG. 37 is a perspective view schematically showing the placement of multiple flexible blankets of FIG. 21 only a bank to prevent erosion.

FIG. 37 is a perspective view schematically showing the placement of multiple flexible blankets 6000, 6000', etc. on a bank 1210 to prevent erosion. In various embodiments the plurality of mats 6000 are removed from the interior 4100 of the mobile remote setting facility 4000 using a crane with rigging 6900 and placed on the selected installation locations.

Placement of Blankets

Figure 38:
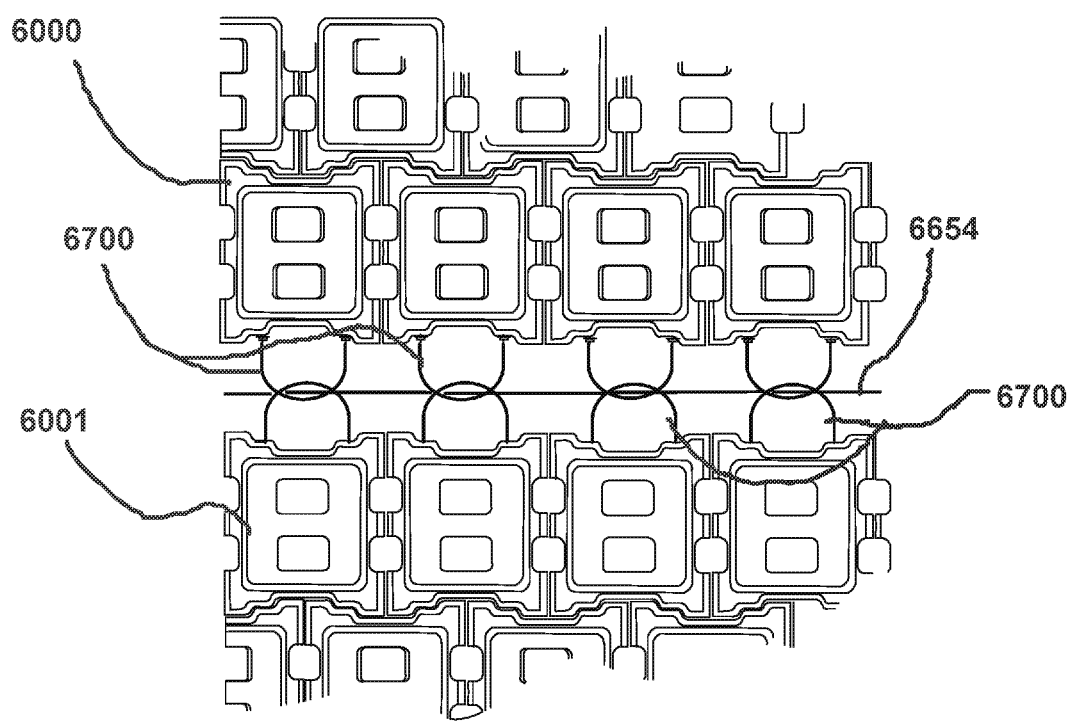
FIGS. 38 and 39 schematically show connecting the multiple blankets to each other.
Figure 39:
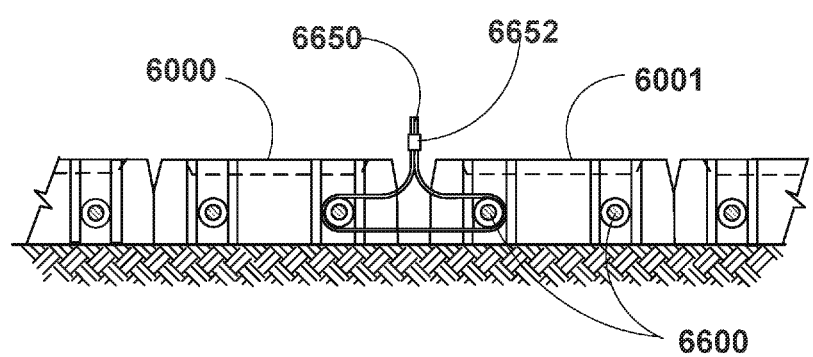

FIG. 37 is a perspective view schematically showing the placement of multiple flexible blankets 6000, 6001, etc. on a bank 1210 to prevent erosion. FIGS. 38 and 39 schematically show connecting the multiple blankets 6000, 6001 to each other.

After the period of incubation, the hopper barge 4000 may be released from its moorings and moved to a desirable location near the shoreline 1200,1300 or bank where the blankets 2000 are to be deployed. Each blanket 6000 may then be lifted out of the hopper barge 4000 by a crane or other lifting means and laid down over the bottom 1220, sidewalls 1210,1310 and/or banks 1200,1300 and shorelines to be protected, as shown for example in FIG. 6.

In various embodiments, where water depth allows navigation of the water based mobile setting facility 4000, the mobile setting facility 4000 can be moved via water and into place immediately adjacent the selected location for ultimate placement of the plurality of mats 6000. Alternatively, in various embodiments, where the water depth is too shallow to allow for navigation of the water based mobile setting facility 4000, the mobile setting facility can be moved substantially as far as navigable water permits and then the plurality of mats 6000 removed from the mobile setting facility 4000 and loaded onto a vessel which can continue to navigate in the water such as a deck barge. In the instance of a deck barge the plurality of mats can be lifted by a crane barge onto the deck of the work barge.

In various embodiments the plurality of mats 6000 are placed in a selected location to prevent erosion. In various embodiments the selected location includes a sidewall 1210, 1310 of a waterway. In various embodiments the selected location is substantially underwater.

In various embodiments the plurality of blankets 6000 can be placed adjacent one another to form a larger retaining wall or living blank. In these embodiments the individual blankets 6000 can be fastened to each other by conventional fastening techniques. FIGS. 38 and 39 schematically show connecting the multiple blankets 6000, 6000' to each other using wire stubs/cross blanket connectors 6650, locking units 6652, connecting means 6654 and support loops 6700.

In various embodiments a protective covering can be placed over substantially all of the top surface 6030 of each of the plurality of mats 6000. In one embodiment the protective covering can be a biodegradable predator net.

In various embodiments after placement of the processed plurality of mats or blankets at the predesignated erosion control location, the oysters on these plurality of mats or blankets will continue to grow together to form a "living blanket" which over time will combine into a solid reef of oysters.

In various embodiments, after being removed from the interior 4100 of the mobile remote setting facility 4000, the lower surface 6040 of at least one of the plurality of mats 6000 is placed on top of at least one of the other of the plurality of mats 6000'. This can occur for example, where the remote setting activities are not immediately adjacent the selected location for placement of the plurality of mats 6000. In this situation the plurality of mats may be removed from the mobile remote setting facility 4000, and loaded onto another means of transportation to the ultimate selected location for placement of the plurality of mats 6000. During the transfer from the mobile remote setting facility to the alternative means of transportation one or more of the plurality of mats 6000 may need to be stacked on top of each other. FIG. 36 is a perspective view of the showing a first flexible blanket 6000' being lowered a second flexible blanket 6000. Because the plurality of blocks 200 for lower blanket 6000 have recessed areas 400 at least the oyster spat set in those recessed areas will not be harmed or damaged by upper blanket 6001.

In various embodiments a plurality of water based mobile setting facilities 4000, 4000' can be used, for example, for large scale erosion control projects. In these embodiments, after a first water based mobile setting facility 4000 is emptied of its plurality of seeded blankets 6000 being substantially covered with oyster spat, it can be sent to a predesignated loading facility where the first mobile setting facility 4000 is filled again with new plurality of mats 6000 which will require being set with oyster spat using one or more of the methods described in this specification. During the time period that the first water based mobile setting facility 4000 is being sent back to a predesignated loading area for refilling, being refilled, and then returning to the predesignated location for remote setting, a second water based mobile setting facility 4000' can be engaged in the process of remote setting oyster spat on a plurality of mats 6000 hung in the interior 4100' of the second water based mobile setting facility 6000' using one or more embodiments disclosed herein.

In various embodiments at least part of the placement of multiple flexible blankets 6000, 6001, etc. on a bank 1210 to prevent erosion is above the average mean elevation 1404 of the water surface. In these embodiments plant life can be artificially seeded (e.g., marsh grass, plants, etc.) on the multiple flexible blankets 6000, 6001, etc. which plant life can ultimately grow and form a protective layer above the multiple flexible blankets 6000, 6001, etc. and/or assist in stabilizing the multiple flexible blankets 6000, 6001, etc. from future movement after placement. After placement of the multiple flexible blankets 6000, 6001, 6002, etc., the plant life can be artificially seeded (e.g., marsh grass, plants, etc.) on at least a portion of the multiple flexible blankets 6000, 6001, etc. such as the exposed surface above the average mean elevation 1404 of the water surface. In one embodiment artificial seeding of the plant life can be performed by spraying the upper faces 6030 of the multiple flexible blankets 6000, 6001, etc. with plant seeds and/or by placing plant stalks/stems into the vertical openings 282 of the precast blocks 200 of the multiple flexible blankets 6000, 6001, etc. In one embodiment on average at least one plant stalk/stem can be placed in the vertical openings 282 of the precast blocks 200 of the multiple flexible blankets 6000, 6000', etc. for the exposed surface of the multiple flexible blankets 6000, 6001, etc. above the average mean elevation 1404 of the water surface.

Land Based Mobile Remote Setting System

Figure 34:
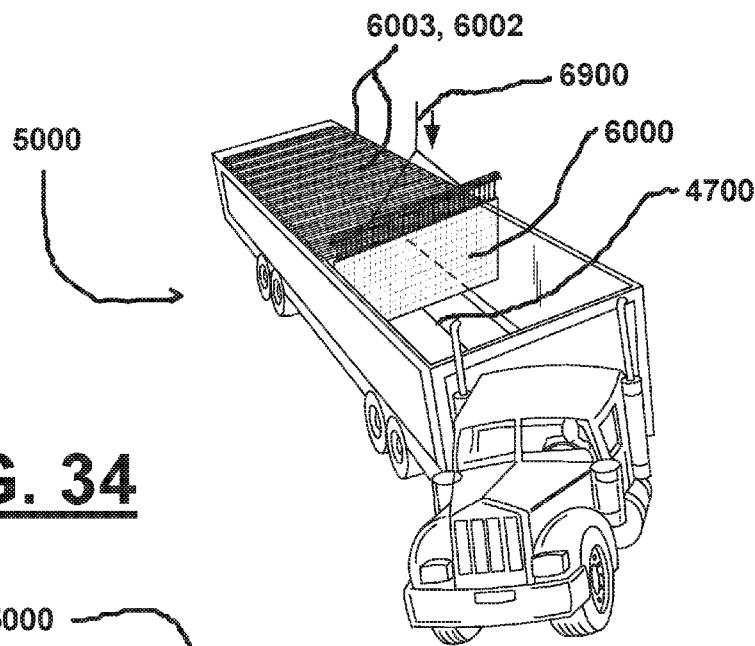
FIG. 34 is a perspective view of the land-based mobile sparging system showing blankets a flexible blanket of FIG. 21 being lowered into the truck.
Figure 33:
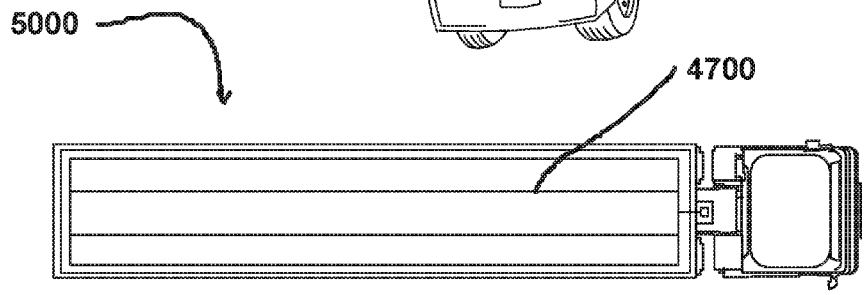
FIG. 33 is a top view of a remote setting land-based mobile sparging system.
Figure 35:
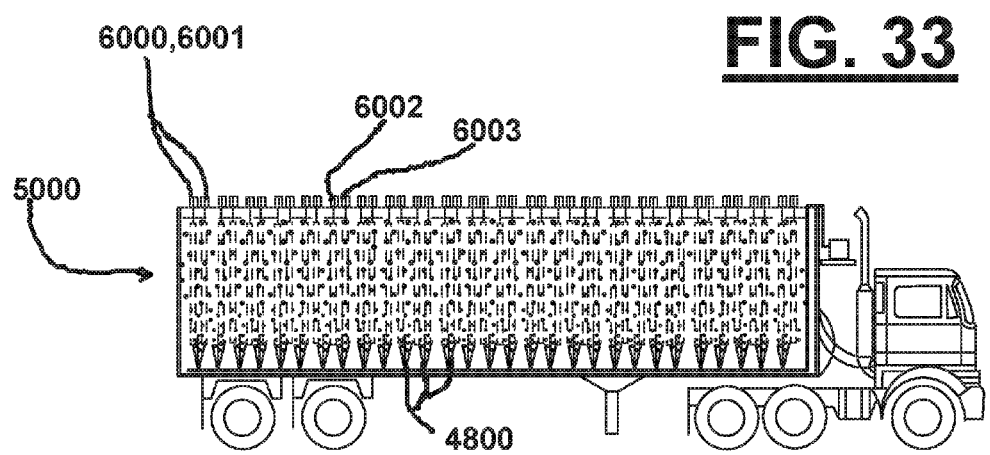
FIG. 35 is a side view of the land based mobile sparging system of FIG. 33 showing sparging occurring with the system filled with a plurality of blankets of FIG. 21

FIG. 33 is a top view of a remote setting land-based mobile sparging system 5000 which includes a sparging system 4700 substantially as disclosed for the water based mobile sparging system 4000. FIG. 34 is a perspective view of the land-based mobile sparging system 5000 showing a plurality of blankets 6000', 6000" already hanging and an new blanket 6000 being lowered into the truck. FIG. 35 is a side view of the land based mobile sparging system 5000 showing sparging occurring with the system 5000 filled with a plurality of blankets 6000.

Reseeding

In one embodiment, where there is death or inadequate growth of oysters after placement on the plurality of mats or blankets 6000, the areas of death or inadequate growth can be reseeded with oyster spat for setting and growth. In this embodiment pieces of oyster shell (fossilized or freshly harvested) can be arranged in large baskets. Oyster spat or larvae can be seeded onto these shells using a remote setting process as described above. After a good set is complete, the shells with now set oyster spat or larvae can be blown overboard by barges. It is expected that the individual pieces of oyster shell would fall from the surface to the previously placed plurality of mats or blankets, and then settle into recessed areas and/or openings in the plurality of mats or blankets. This "reseeding" introduces a new set of live oyster spat onto the plurality of mats or blankets and wherein this new live oyster spat or larvae can continue to grow on the already placed plurality of mats.

Vertical Curtain to Protect Dropped Eyed Larvae while Setting onto Blanket

Figure 40:
FIG. 40 is a side view of a previously placed mat or blanket where a portion of the spat died causing a blighted area.
Figure 41:
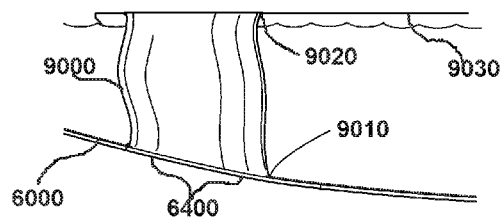
FIG. 41 is a side view of one method of reseeding a portion of an already laid blanket including a protective curtain perimeter.
Figure 42:
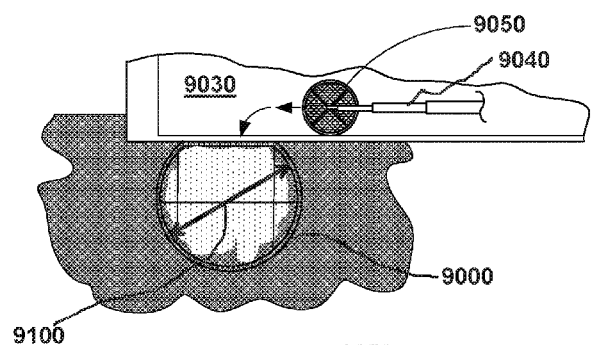
FIG. 42 is a top view of the protective curtain of FIG. 41.
Figure 43:
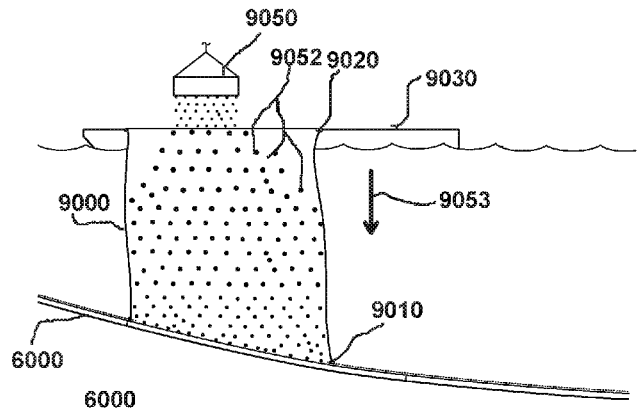
FIG. 43 is a side schematic view of the curtain of FIG. 41 schematically showing oyster larvae being dropped in the protected area of the curtain.
Figure 44:
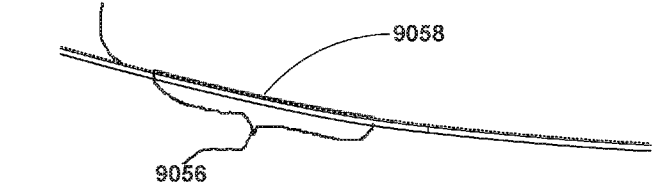
FIG. 44 is a side schematic view of the blanket after the reseeded larvae have formed spat on the blighted area.

FIG. 40 is a side view of a previously placed mat or blanket 6000 where a portion 6400 of the spat died. FIG. 41 is a side view of one method of reseeding a portion of an already laid blanket 6000 including a protective curtain perimeter 9000. FIG. 42 is a top view of the protective curtain 9000. FIG. 43 is a side schematic view of the curtain 9000 schematically showing oyster larvae 9052 being dropped in the protected area 9100 of the curtain 9000. FIG. 44 is a side schematic view of the blanket after the reseeded larvae 9052 have formed spat on the blighted area 6400.

A protective screening curtain 9000 can be used to surround an area 6400 of a previously seeded mat or blanket 6000 which may require reseeding after death of prior oyster spat. The protective curtain 9000 can be vertically oriented and extends from the flexible mat 6000 (at its bottom portion 9010) to the top of the water surface (at top 9020). This embodiment can typically be used in water of less than 8 feet depth. The protective screening curtain 9000 preferably is comprised of a material that allows water flow but restricts larvae 9052 movement. When larvae 9052 become ready to set (i.e., hot larvae), which occurs at approximately the two week mark, they have grown an eye and a foot. The eyed larvae ready to set are collected at the hatching facility and cooled to slow them down and put them into a semi-hibernation state. The cooled temperature should be greater than freezing (as freezing would kill the larvae) and preferably about 38 degrees F. The cooled larvae are transported to the area 6400 of the previously laid mat or blanket 6000 and slowly warmed to ambient temperature to avoid shocking the eyed larvae by a too large temperature gradient (such as by introducing the larvae to warmer water and stirring the mixture of water and larvae). For example the warming period can be between 2 to 4 hours. Once the larvae 9052 have been brought to ambient temperature, the larvae can be introduced to the area 9100 protected by the screening curtain 9000 and the previously seeded mat or blanket. When the larvae are dropped into the water they tend to fall down in the curtain/screened off area (schematically indicated by arrow 9053) and onto the flexible mat 6000. The curtain 9000 restricts movement of the larvae 9052 to the area between the curtain 9000 and the previously seeded mat or blanket 6000 increasing the chances of setting on this area 6400. The curtain 9000 remains in place (containing the larvae 9052 in this area 9100) for a predefined period of time for setting (e.g., 96 hours) to allow the larvae 9052 to set on the previously seeded mat or blanket 6000. After the curtain 9000 is removed, a predator net can be applied to the mat or blank to protect the newly set larvae against predators.

Dumping Seeding Substrate onto Blanket from Water Surface

Alternatively, additional substrate can be remotely seeded and transported to the area 6400 of a previously seeded mat or blanket 6000 which may require reseeding after death of prior oyster spat. The additional substrate can be dried shells, fossilized shells, or any type of rock. The substrate can be ground, broken, or whole. Although not shown, oyster larvae can be remotely set on this substrate in a hatchery environment such as by using baskets, sacks, or loose in a tank. The additional substrate is placed in the baskets, sacks, or tank with water and larvae is added to the water and at least 96 hours is allowed for the larvae to set. The now seeded additional substrate can be transported (e.g., by boat or barge) to the location of the previously seeded mat or blanket 6000 then placed above the impacted area 6400 of the previously seeded mat or blanket 6000 without using a protective curtain 9000 (e.g., put overboard of the boat or barge). The now seeded additional substrate will fall through the water and land on top of the impacted area 6400 of the previously seeded mat or blanket 6000. The now seeded additional substrate can be put overboard by blowing it with air or manually dumping it overboard. The now seeded additional substrate falls through the water and settles into the open spaces of the plurality of recessed blocks that make up the blankets 6000 (e.g., recessed areas and holes in blanket 6000). The now placed seeded additional substrate will allow the mat or blanket 6000 area 6400 to recolonize.

The following is a list of reference numerals:

LIST FOR REFERENCE NUMERALS

| (Reference No.) | (Description) |
|---|---|
| 10 | method and apparatus |
| 100 | living blanket |
| 200 | precast block |
| 201 | lower precast block |
| 210 | height |
| 240 | cables |
| 250 | tunnels |
| 260 | vertical openings |
| 262 | vertical openings |
| 270 | U-shaped vertical channels |
| 272 | U-shaped vertical channels |
| 280 | vertical openings |
| 300 | upper perimeter edge |
| 400 | recessed area |
| 410 | lower top surface |
| 410 | lower vertical second tier surface |
| 420 | depth |
| 500 | bottom/lower base |
| 600 | half block |
| 650 | left perimeter |
| 654 | right perimeter |
| 1000 | waterway |
| 1200 | first bank of waterway/side/bank |
| 1202 | grass |
| 1210 | sidewall |
| 1212 | eroded portion/sidewall erosion |
| 1216 | portion likely to slough off due to erosion |
| 1220 | bottom/water bottom |
| 1230 | at risk portion |
| 1300 | second bank of waterway/side/bank |
| 1310 | sidewall |
| 1400 | wave |
| 1404 | average elevation of water |
| 1410 | wave crest |
| 1420 | wave trough |
| 1430 | average mean elevation |
| 1450 | wave |
| 1460 | wave crest |
| 1470 | wave trough |
| 1480 | average mean elevation |
| 1500 | marine vessel |
| 2000 | blanket/pocket or pillow blanket |
| 2001 | blanket/pocket or pillow blanket |
| 2010 | top |
| 2012 | header |

LIST FOR REFERENCE NUMERALS

| (Reference No.) | (Description) |
|---|---|
| 2020 | bottom |
| 2030 | support beam/header |
| 2031 | support beam/header |
| 2032 | lateral support bracket |
| 2050 | upper portion |
| 2051 | upper portion |
| 2052 | reinforced strands of netting/strands |
| 2054 | netting |
| 2100 | lower portion |
| 2200 | first plurality of pockets or pillows |
| 2210 | upper portion of pillows |
| 2220 | lower portion of pillows |
| 2230 | base |
| 2250 | plurality of pockets or pillows encasing cultch which is seeded with oyster larvae/pocket |
| 2300 | cultch |
| 2350 | concrete encased rod |
| 2352 | support rod |
| 2356 | concrete encasement |
| 2400 | plurality of supports such as stakes or poles |
| 2500 | second plurality of pockets or pillows |
| 2550 | second plurality of pockets or pillows encasing cultch which is seeded with oyster larvae |
| 2570 | cultch |
| 2700 | blanket including a plurality of hollow bowl shaped containers interconnected |
| 2710 | covering/netting |
| 2750 | plurality of interconnected bowls/bowls |
| 2790 | interconnecting means/cable/rope |
| 2792 | knot |
| 2800 | interconnecting reinforcement |
| 2900 | bowl/container |
| 2901 | bow/container |
| 2910 | interior/interior surface |
| 2950 | base |
| 2955 | planar bottom |
| 4000 | barge/remote setting water-based mobile sparging system |
| 4010 | body |
| 4020 | upper surface |
| 4030 | lower surface |
| 4100 | interior |
| 4104 | perimeter edge |
| 4105 | sidewalls |
| 4110 | floor |
| 4200 | plurality of pilings |
| 4500 | water surface |
| 4600 | water surface |
| 4700 | sparging system |
| 4702 | compressor |
| 4710 | plurality of sparging lines |
| 4712 | first line |
| 4713 | direction of flow/arrow |
| 4714 | second line |
| 4715 | direction of flow/arrow |
| 4716 | third line |
| 4717 | direction of flow/arrow |
| 4718 | fourth line |
| 4719 | direction of flow/arrow |
| 4720 | plurality of sparging openings |
| 4750 | main sparging air inlet |
| 4780 | support bracket |
| 4800 | plurality of jets of air |
| 4810 | plurality of sparging bubbles |
| 5000 | remote setting land-based mobile sparging system/trailer/train |
| 5010 | container/body |
| 5020 | upper surface |
| 5025 | plurality of recessed areas |
| 5030 | lower surface |
| 5040 | base |
| 5045 | plurality of wheels |
| 5100 | interior |
| 5110 | floor |
| 5500 | water surface |
| 5610 | portion of blanket above water surface |
| 5620 | portion of blanket below water surface |
| 6000 | flexible blanket |
| 6001 | flexible blanket |
| 6002 | flexible blanket |
| 6003 | flexible blanket |
| 6010 | top |
| 6020 | bottom |
| 6030 | upper face |
| 6031 | upper face |
| 6040 | lower face |
| 6041 | lower face |
| 6050 | left perimeter |
| 6054 | right perimeter |
| 6100 | plurality of interconnected blocks |
| 6101 | plurality of interconnected blocks |
| 6200 | row |
| 6204 | row |
| 6208 | row |
| 6300 | column |
| 6304 | column |
| 6308 | column |
| 6400 | dead or blighted area for spat |
| 6600 | plurality of connecting wires |
| 6650 | wire stubs/cross blanket connector |
| 6652 | locking unit/connecting means |
| 6654 | connecting means |
| 6700 | plurality of support loops |
| 6800 | support beam |
| 6810 | lateral support bracket/lateral support |
| 6850 | plurality of support straps |
| 6851 | plurality of support straps |
| 6900 | rigging |
| 8000 | sprinkler system |
| 8010 | first water source |
| 8020 | second water source |
| 8030 | plurality of nozzles |
| 8050 | plurality of water streams |
| 9000 | protective curtain |
| 9010 | lower end |
| 9020 | upper end |
| 9030 | floatation device for top of curtain |
| 9100 | protective area |
| 9050 | dispenser |
| 9052 | larvae |
| 9053 | arrow |
| 9056 | spat |
| 9058 | upper surface reseeded with spat |

All measurements disclosed herein are at standard temperature and pressure, at sea level on Earth, unless indicated otherwise. All materials used or intended to be used in a human being are biocompatible, unless indicated otherwise.

It will be understood that each of the elements described above, or two or more together may also find a useful application in other types of methods differing from the type described above. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention set forth in the appended claims. The foregoing embodiments are presented by way of example only; the scope of the present invention is to be limited only by the following claims.

While certain novel features of this invention shown and described below are pointed out in the annexed claims, the invention is not intended to be limited to the details specified, since a person of ordinary skill in the relevant art will understand that various omissions, modifications, substitutions and changes in the forms and details of the device illustrated and in its operation may be made without departing in any way from the spirit of the present invention. No feature of the invention is critical or essential unless it is expressly stated as being "critical" or "essential."

The invention claimed is:

1. A method for preventing erosion comprising:
   (a) providing a plurality of articulating base structure mats or blankets, each mat or blanket comprising a plurality of interconnected blocks wherein the blocks are comprised of concrete having oyster shell as aggregate;
   (b) providing a mobile remote setting system having an interior, and at a first location placing the plurality of articulating base structure mats or blankets in the interior of the mobile remote setting system, wherein the plurality of articulating base structure mats or blankets are suspended within the mobile remote setting system;
   (c) moving the mobile remote setting system from the first location to a second location;
   (d) at the second location placing oyster larvae in the interior of the mobile remote setting system and allowing the oyster larvae to set on the plurality of articulating base structure mats or blankets for a predefined period of time for setting; and
   (e) wherein after step "d" the plurality of articulating base structure mats or blankets are removed from the interior of the mobile remote setting system and placed at a selected erosion prevention location.

2. The method of claim 1, wherein the mobile remote setting system is a mobile water based facility.

3. The method of claim 1, wherein in step "a" the oyster shell aggregate is comprised of fossilized oyster shell.

4. The method of claim 1, wherein step "c" occurs after step "b" and the second location is spaced apart from the first location by at least a predefined distance.

5. The method of claim 1, wherein during step "e" the plurality of articulating base structure or mats are placed at the selected location which selected location is adjacent the second location of step "c".

6. The method of claim 1, further comprising the step of supporting each of the plurality of articulating base structure mats or blankets with a header or spreader bar.

7. The method of claim 1, wherein in step "b" each of the plurality of articulating base structure mats or blankets have a upper face and lower face and are hung in paired sets with each lower face of the paired articulating base structure mats or blankets pointing towards each other.

8. The method of claim 1, wherein in step "d" the mobile remote setting system comprises an air sparging system having an air compressor fluidly connected to a plurality of sparging pipes, each of the plurality of sparging pipes including a plurality of sparging openings.

9. The method of claim 1, wherein before step "d", filling the interior of the mobile remote setting facility with water sufficient to cover the top of the plurality of articulating base structure mats or blankets, sparging the water and mats for a predetermined period of time, and then removing substantially all of the water from the interior of the mobile remote setting facility.

10. The method of claim 1, wherein during step "d" filling the interior of the mobile remote setting facility with water sufficient to cover the top of the plurality of articulating base structure mats or blankets, sparging the water while the oyster larvae set on the plurality of articulating base structure mats or blankets.

11. The method of claim 1, wherein during step "d" the predefined period of time for setting is at least 48 hours.

12. The method of claim 1, wherein during step "d" concentrated algae is introduced into the water to feed the larvae during setting.

13. The method of claim 1, wherein between steps "d" and "e", for at least a predefined post setting feeding period, adding feed to the interior of the remote setting facility in a sufficient amount to facilitate rapid growth of the larvae after setting.

14. The method of claim 13, wherein during the predefined post setting feeding period water having feed is added to the interior of the mobile remote setting facility, while at the same time water from the interior is pumped out substantially maintaining a constant water level in the interior.

15. The method of claim 1, wherein in step "b" each of the plurality of articulating base structure mats or blankets comprises a plurality of interconnected blocks that articulate relative to each other, and each of the plurality of interconnected blocks include top and bottom faces with the top face having a recess and the rear face being substantially flat or planar.

16. The method of claim 15, wherein each of the plurality of interconnected blocks have a height and the recesses of each of the interconnected blocks has a depth which falls within the range of between 10 and 50 percent of the height.

17. A method for preventing erosion comprising:
   (a) providing a plurality of articulating base structure mats or blankets, each mat or blanket comprising a plurality of interconnected blocks wherein the blocks are comprised of concrete having oyster shell as aggregate;
   (b) providing a mobile remote setting system having an interior, and at a first location placing the plurality of articulating base structure mats or blankets in the interior of the mobile remote setting system;
   (c) moving the mobile remote setting system from the first location to a second location;
   (d) at the second location placing oyster larvae in the interior of the mobile remote setting system and allowing the oyster larvae to set on the plurality of articulating base structure mats or blankets for a predefined period of time for setting;
   (e) wherein after step "d" the plurality of articulating base structure mats or blankets are removed from the interior of the mobile remote setting system and placed at a selected erosion prevention location, and
   (f) removing the plurality of articulating base structure mats or blankets from the interior of the mobile remote setting system and placing them at the selected erosion prevention location, wherein each of the plurality of articulating base structure mats or blankets have an upper face and a lower face and after being removed from the interior of the mobile remote setting facility, the lower face of at least one of the plurality of articulating base structure mats or blankets is placed on top of the upper face of at least another one of the other of the plurality of articulating base structure mats or blankets.

18. The method of claim 17, wherein during step "f", each of the plurality of articulating base structure mats or blankets have an upper face and a lower face, and a protective covering is placed over substantially all of the upper faces of each of the plurality of articulating base structure mats or blankets.

19. A method for preventing erosion comprising:
(a) providing a plurality of articulating base structure mats or blankets, each mat or blanket comprising a plurality of interconnected blocks wherein the blocks are comprised of concrete having oyster shell as aggregate;
(b) providing a mobile remote setting system having an interior, and at a first location placing the plurality of articulating base structure mats or blankets in the interior of the mobile remote setting system;
(c) moving the mobile remote setting system from the first location to a second location;
(d) at the second location placing oyster larvae in the interior of the mobile remote setting system and allowing the oyster larvae to set on the plurality of articulating base structure mats or blankets for a predefined period of time for setting; and
(e) wherein after step "d" the plurality of articulating base structure mats or blankets are removed from the interior of the mobile remote setting system and placed at a selected erosion prevention location, wherein a second mobile remote setting system having an interior is provided and during step "c" and a second plurality of articulating base structure mats or blankets is being hung in the interior of the second mobile remote setting system.

\* \* \* \* \*